United States Patent
Goldman

(10) Patent No.: US 7,287,817 B2
(45) Date of Patent: Oct. 30, 2007

(54) METHODS AND DEVICES FOR ENHANCING HEALTH, SAFETY, AND COMFORT ON CONVEYANCES IN RELATION TO RECLINING SEATS

(76) Inventor: Ira H. Goldman, 1816 Kilbourne Pl. NW., Washington, DC (US) 20010

( * ) Notice: Subject to any disclaimer, the term of this patent is extended or adjusted under 35 U.S.C. 154(b) by 200 days.

(21) Appl. No.: 10/920,071

(22) Filed: Aug. 17, 2004

(65) Prior Publication Data

US 2005/0040681 A1    Feb. 24, 2005

Related U.S. Application Data

(60) Provisional application No. 60/496,303, filed on Aug. 19, 2003.

(51) Int. Cl.
*A47B 83/02* (2006.01)
(52) U.S. Cl. .................. 297/463.2; 297/146; 297/310; 297/463.1
(58) Field of Classification Search ................ 297/146, 297/188.04, 188.05, 310, 463.1, 463.2; 248/188.8, 248/188.9, 345.1
See application file for complete search history.

(56) References Cited

U.S. PATENT DOCUMENTS

| | | | | |
|---|---|---|---|---|
| 1,158,350 A | * | 10/1915 | White | ..................... 248/345.1 |
| 1,445,726 A | * | 2/1923 | Soros | ..................... 248/345.1 |
| 1,878,850 A | * | 9/1932 | Hilgers | ..................... 108/28 |
| 4,123,102 A | * | 10/1978 | Landry et al. | ..................... 297/270.2 |
| 4,948,195 A | * | 8/1990 | Saunders | ..................... 297/182 |
| 5,087,006 A | * | 2/1992 | Wrench | ..................... 248/214 |
| 5,160,105 A | * | 11/1992 | Miller | ..................... 248/188.9 |
| 5,758,544 A | | 6/1998 | Lee | |
| 6,135,480 A | * | 10/2000 | James | ..................... 297/310 |
| 6,229,693 B1 | | 5/2001 | Karidis et al. | |
| 7,014,047 B2 | * | 3/2006 | Stapleton | ..................... 248/345.1 |

OTHER PUBLICATIONS

"RMUTT"; "Airline passenger anti-knee-crush device"; Halfbakery.com; date-stamped Apr. 6, 2001; copy printed Aug. 14, 2004; http://www.halfbakery.com/idea/Airline_20passenger_20anti-knee-crush_20device.

* cited by examiner

*Primary Examiner*—Peter R. Brown

(57) ABSTRACT

A method and device for enabling an aft passenger on a conveyance to establish protection from a forward seatback, irrespective of a conventional effort by a forward passenger to cause reclining of the forward seatback. A device is disclosed that includes a main body and additional elements appended to the main body. The device is adapted for access by the aft passenger to activate it in order to inhibit such reclining. In one preferred embodiment, the device is adapted for use on an airplane to engage the forward seatback and an arm of a tray table designated for use by the aft passenger. In another preferred embodiment, the device comprises a recline inhibitor component connected to a depressible safety input control which is integrated with a rearward portion of a seat for access by the aft passenger.

31 Claims, 6 Drawing Sheets

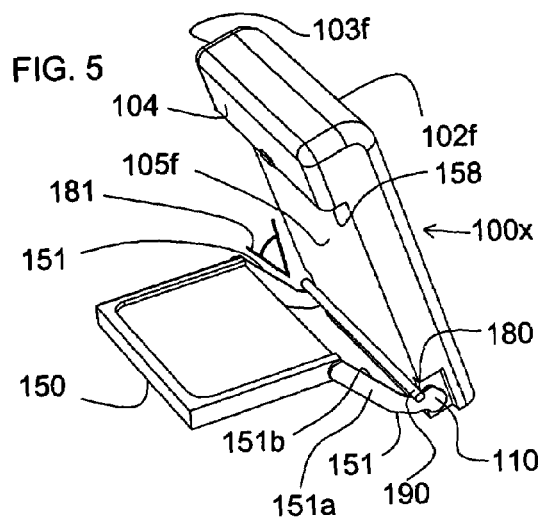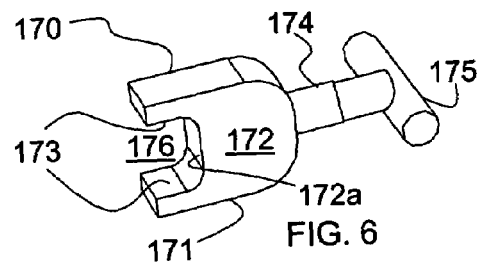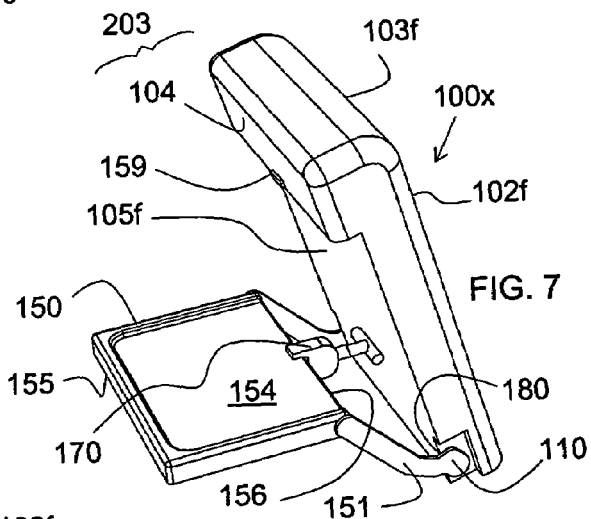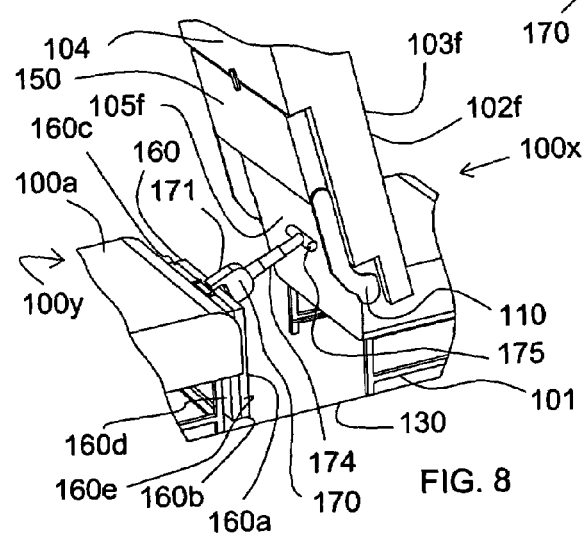

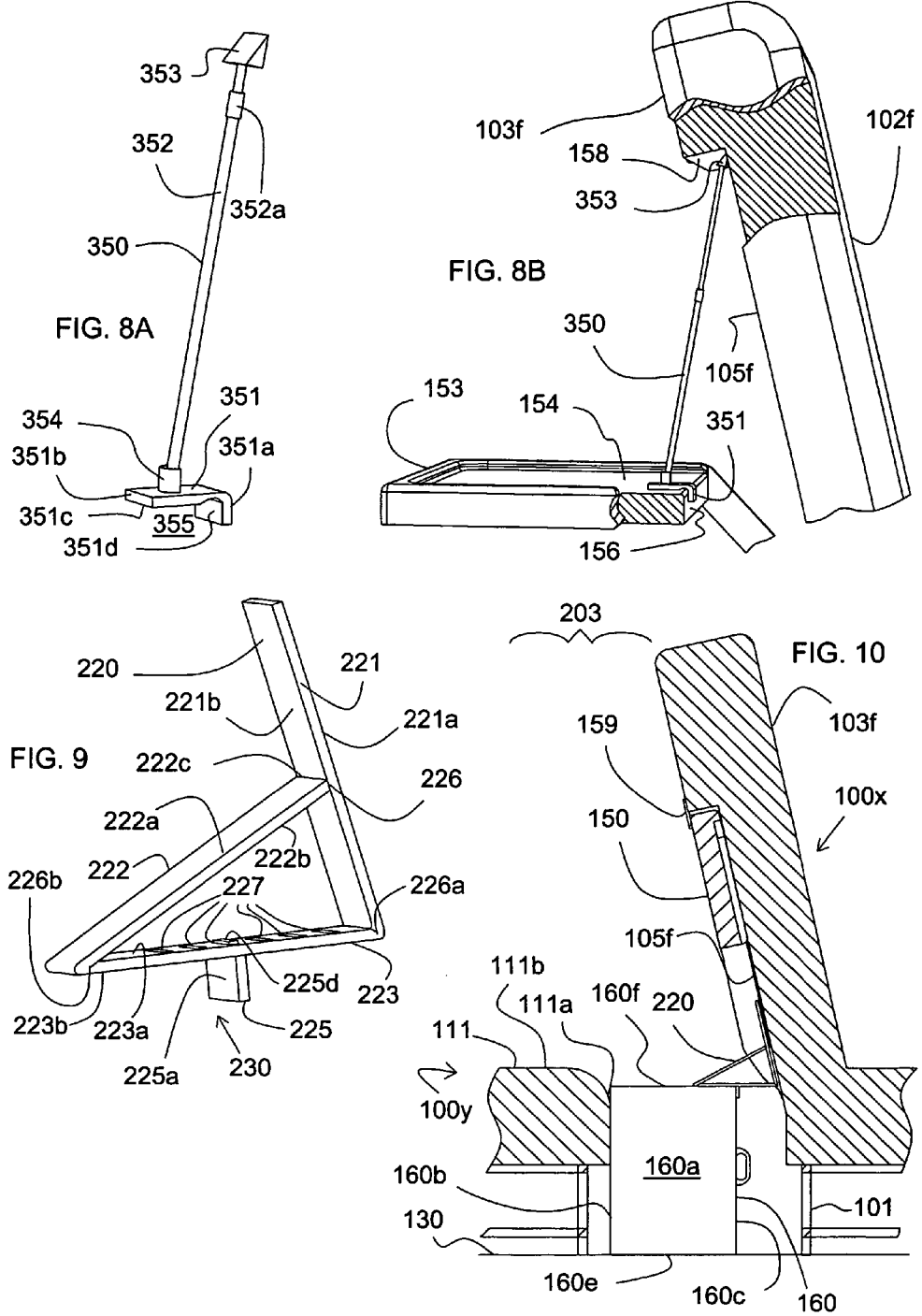

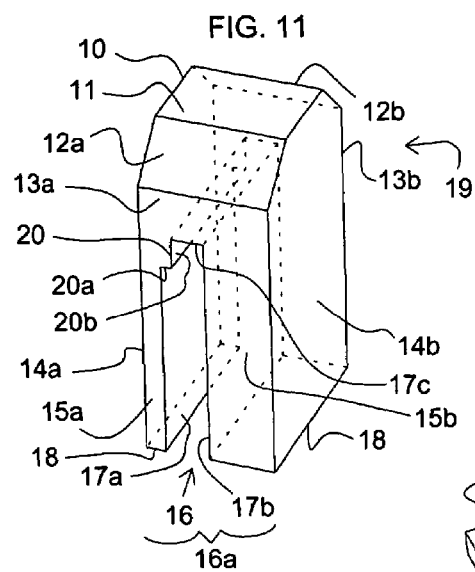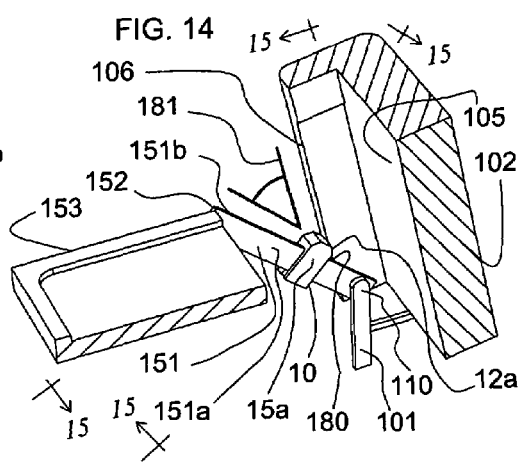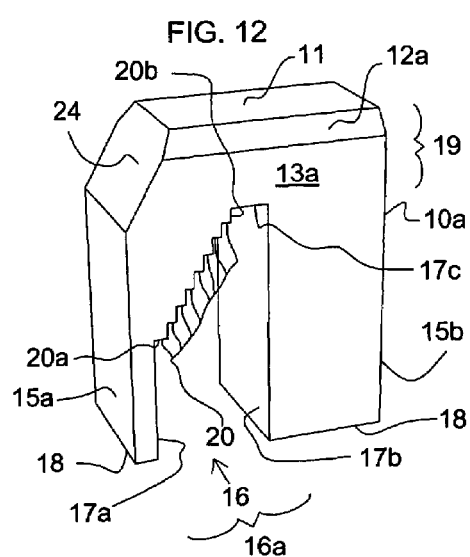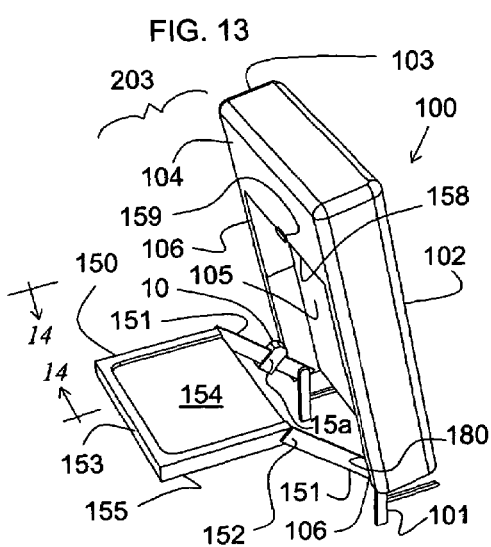

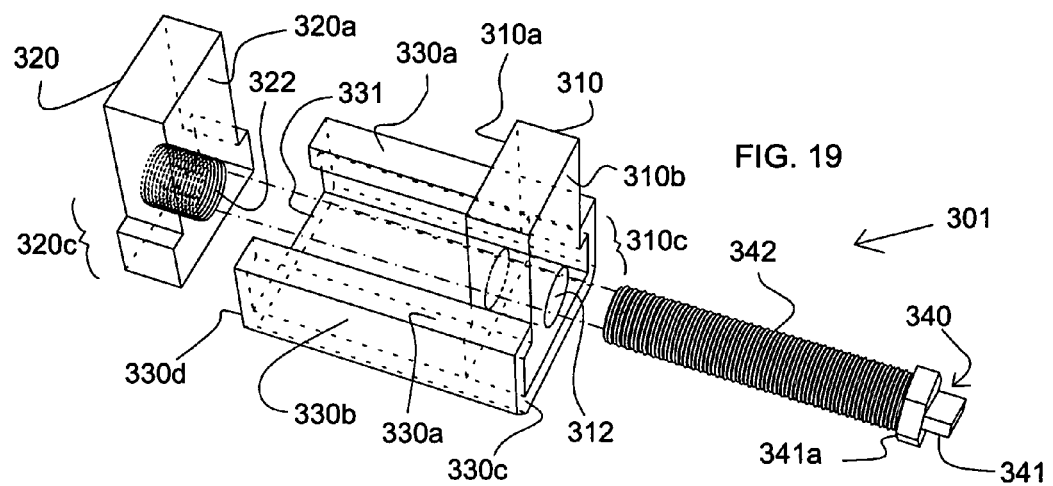
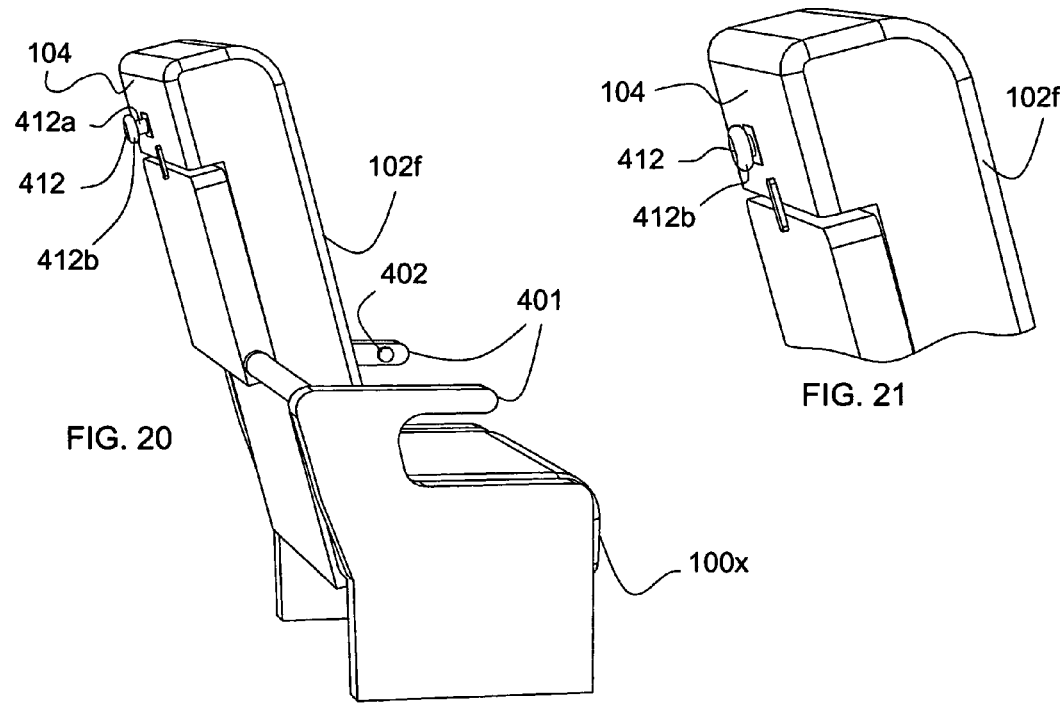

METHODS AND DEVICES FOR ENHANCING HEALTH, SAFETY, AND COMFORT ON CONVEYANCES IN RELATION TO RECLINING SEATS

CROSS-REFERENCE TO RELATED APPLICATION

This application claims the benefit of U.S. provisional application Ser. No. 60/496,303, filed on Aug. 19, 2003, the entire content of which is hereby incorporated herein by reference.

FIELD OF INVENTION

The invention relates to methods and devices for enhancing the health, safety, and comfort of passengers, their small children, and their belongings when they are traveling on conveyances by inhibiting inopportune reclining of forward passenger seats.

BACKGROUND OF THE INVENTION

On commercial aircraft, passenger seats are generally arranged in a plurality of rows. Each such row comprises one or more seats and is arranged to run perpendicularly to the plane's side walls, from port to starboard. Each row is spaced one from the other at a distance deemed appropriate by the airline responsible for the aircraft. This distance is often referred to as the seat pitch.

Generally there is at least one aisle extending from the front to the rear of the plane in order to facilitate passenger ingress and egress, and this aisle separates the rows into left and right sections. Accordingly, the rows of seats may be divided into groups of seats by the aisle, with, e.g., three seats per row to the left and three seats per row to the right of the aisle.

On many commercial aircraft, reclining means is built into each passenger seat, such means designed to be activated by a passenger seated in such seat, which allows the seat's back to be adjusted from its original so-called upright position to a reclined angle deemed advantageous by the seated passenger. The reclining means, which often comprises an actuator button recessed into one of the seat's armrests, can also be used by the passenger to return the seat to its original upright position.

There is substantial prior art relating to such reclining means.

As a result of the seat pitch established on many commercial aircraft, as a passenger reclines his seat it is liable to make contact with the personal property, food, beverages, or body of a passenger seated directly aft. Banged knees, bumped heads, spilled coffee, and damaged notebook computer screens are just some of the numerous possible, undesirable outcomes of such contact.

Additionally, within airline policies and government regulations, some adult passengers travel with small children for whom no seats are assigned or are available. Such children, often held on an adult's lap and sometimes positioned on the adult's lowered tray table during the flight, are also at risk of being hit in the head or elsewhere by a reclining seat.

Even short of there being any physical contact made by a seat as it is reclined, limited seat pitch combined with reclined seats can impose a dangerous environment on passengers by restricting their legroom. There is growing evidence that a lack of movement, especially on long flights, can engender a medical condition called deep vein thrombosis (DVT), which is a blood clot condition also called "economy class syndrome." Among the recommended prophylactic actions are leg-movement exercises performed while passengers are seated. However, legroom constrained by reclined seats in closely-spaced rows can provide passengers insufficient room to perform these exercises.

Beyond health and safety concerns, reclined seats create other challenges for people seated directly behind them. Karidis, et al., U.S. Pat. No. 6,229,693, recognizes that "a standard airline tray table in coach class seating has very limited space for operating a larger notebook computer . . . The problem is enhanced if the passenger seated in front of the user chooses to recline their seatback." The novel approach disclosed in Karidis is a special linkage arrangement between a base of a notebook computer and its screen component. While this approach can be effective, this linkage arrangement has not been adopted by notebook computer manufacturers. So, a reclined seat in coach class on a commercial aircraft is generally incompatible with use of a notebook computer by a person seated directly aft. Additionally, if such notebook computer is placed on a tray table of the aft passenger and the directly forward seat is thereafter reclined, the movement of the seat's seatback can cause damage to the computer's screen component.

Lee, U.S. Pat. No. 5,758,544, discloses a lock-out device integrated with a seat's reclining activation system. It provides an apparatus via which a person other than the passenger seated in a particular airplane seat can regulate the seat's reclining—specifically, to lock out any such reclining. The device is disclosed as an adjunct for rows of seats adjacent to window exits and its input component is located to restrict access to a flight crew member. Unlike such prior art, the instant application discloses a seat recline regulating system that provides access to and facilitates activation by another passenger, specifically a passenger who is located aft of the seated passenger who might otherwise recline his seat to the detriment of the other passenger, placing at risk substantial concerns of such other passenger.

Generally, a forward passenger is unaware of the affect that reclining his seat will have on a passenger seated directly behind him. Even if the forward passenger were inclined to look back courteously in advance to help reduce the chance of contact or to discern if the reclining of his seatback would inconvenience the aft passenger, today's commercial aircraft seats are often designed and grouped such that there are no visual gaps between the seatbacks. Therefore, in advance of reclining his seat, it is problematic for the forward passenger, while seated, to turn and perform a visual check, or simply to attempt to warn the aft passenger or seek some accommodation by means of eye contact. As a result, the forward passenger often launches his seatback towards the aft passenger, subject only to some post-launch complaint from the aft passenger or a mid-action protrusion of the aft passenger's knees into the seatback and then indirectly into the forward passenger's back.

The present invention was conceived and developed in response to the current situation in which commercial airlines (a) provide passengers with seats most of which can be reclined at will by the passengers in them, to an angle as to the floor of the airplane of a limit predetermined by the airlines, (b) arrange the seats in rows, (c) arrange these rows in such proximity to each other, one behind the other, that a seat reclined normally in one row, prior to reaching its predetermined angular limit, will often, and even predictably, make significant, undesirable contact with the body, belongings, or child of an immediately aft passenger, or otherwise prevent the aft passenger from moving his legs in a health-benefiting way, (d) do not provide passengers desiring to recline with a means to visually assess aftward clearance or otherwise to conveniently seek accommodation from an aft passenger before reclining, and (e) do not provide aft passengers means by which they might act in order to prevent such deleterious effects.

OBJECTS AND SUMMARY

It is an object of the invention to address concerns of certain airline passengers regarding their health, safety, and comfort, as well as the safety of non-fixed objects proximate to them.

It is also an object of the invention to address concerns of certain airline passengers regarding the health, safety, and comfort of children traveling with them.

It is also an object of the invention to address concerns of certain airline passengers regarding enhancing courteousness and promoting a cooperative atmosphere amongst passengers.

It is also an object of the invention to provide novel methods and devices adaptable from use on aircraft to use on other conveyances and within fixed structures.

The invention comprises a novel seat-checking device that allows an airline passenger to establish some protection against an inopportune reclining of an immediately forward seat of another airline passenger.

In the primary preferred embodiments of the invention, this is accomplished by a device being interposed between a rearward portion of a seatback of the forward seat and another object that is aft of that seatback. As described below, such a device may take the form of a brace, a stop, or other forms that advantageously apply the novel aspects of the invention.

According to at least one embodiment of the invention, a device enables a passenger to exercise some level of control of the timing and extent of the reclining of an immediately forward seat, such a device being generally integrated with said forward seat.

BRIEF DESCRIPTIONS OF THE DRAWINGS

FIG. 5 shows a perspective view of a seatback with a flat back on which has been deployed a preferred embodiment of the invention, namely a rod employed to restrict the reclining of a seatback.

FIG. 6 shows another embodiment of the invention.

FIG. 7 shows the embodiment of FIG. 6 interposed between two components of a seatback-F assembly so as to restrict the reclining of the seatback.

FIG. 8 shows a perspective view of the embodiment of FIG. 6 employed in combination with a briefcase to restrict the reclining of a seatback-F.

FIG. 8A shows a perspective view of another embodiment of the present invention.

FIG. 8B shows a perspective view of the embodiment of FIG. 8A beneficially engaged with a seatback assembly.

FIG. 9 shows a perspective view of another embodiment of the present invention.

FIG. 10 shows a side view of the embodiment of FIG. 9 beneficially engaged with a briefcase and the flat-back seats.

FIG. 11 shows a front perspective view of another embodiment of the present invention, a safety stop.

FIG. 12 shows a perspective view of another embodiment of the present invention, a multi-step stop.

FIG. 13 shows a perspective view of a section of a seat with which the embodiment of FIG. 11 has been beneficially engaged in order to regulate reclining of a seatback.

FIG. 14 shows a detailed view of a portion of FIG. 13.

FIG. 19 shows a perspective view from below of an exploded view of the embodiment of FIG. 17.

FIG. 20 illustrates the flat-back seat adapted to comprise a novel safety control device.

FIG. 21 provides a detailed view of a portion of FIG. 20.

DETAILED DESCRIPTION OF PREFERRED EMBODIMENTS

Conventional Flat-Back Seatbacks

Figure 1:
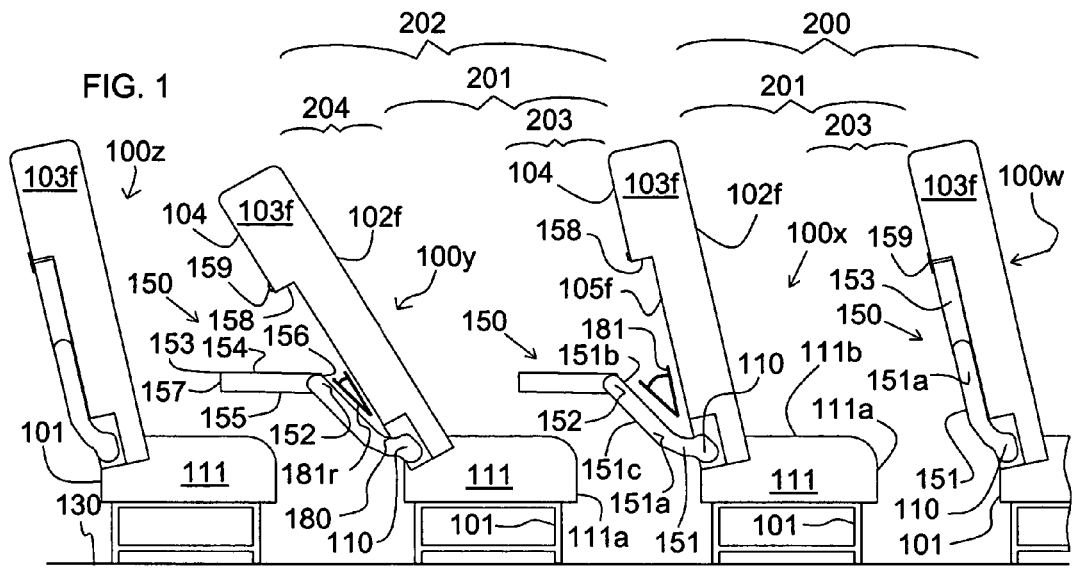
FIG. 1 shows a side view of four rows of conventional seats with flat backs in order to illustrate seat components and regions of passenger interest which are of relevance to the invention.

FIG. 1 shows a straight-on side view of four rows of conventional seats with a flat back, i.e., seat $100w$, seat $100x$, seat $100y$, and seat $100z$. FIG. 1 also illustrates regions of passenger interest, such as passenger concerns about incursions into his safety region.

Seat $100w$ through seat $100z$ are identical, comprising identical components. The arrangement of some of their components in different conditions and the arrangement of the seats themselves into four rows help provide a foundation for descriptions of various novel elements of the invention, below.

Seats $100w$ through $100z$ each comprises a seat base 101 and a seatback-F assembly $102f$. The seatback-F assembly $102f$ comprises a seatback-F $103f$ and a tray table assembly 150. The seatback-F comprises a rearward portion 104 which comprises a flat back $105f$.

The tray table assembly 150 comprises a table 153 and arms 151. The table 153 comprises a table top 154, a table bottom 155, a front edge 156, and a table aft edge 157, while each arm comprises two sides $151a$, a top edge $151b$, and a bottom edge $151c$.

Tray table assemblies 150 of seat $100w$ and seat $100z$ are in a closed position—with table top 154 in immediate proximity to a portion of flat back $105f$. Maintenance of this closed position is facilitated by latch 159, which is attached to rearward portion 104 and a forward-facing surface of which is in beneficial contact with table bottom 155.

Latch 159 is connected to rearward portion 104 by a connecting means, not illustrated here, which permits it to be rotated 90 degrees on its central access and thereby come out of contact with the table, thereby allowing the tray table assembly to be lowered for use. The latches of seat 100$x$ and seat 100$y$ have been so rotated in order to allow their tray table assemblies to be lowered.

The process of lowering tray table assembly 150, which makes it possible to use table 153 as a table, comprises beneficial motion of the tray table assembly on two axes. The first such axis is a main axis 110. Axis 110 defines the center of a rotational arc for seatback assembly 102$f$, and in particular both its reclinable seatback and its tray table assembly.

A conventional pivoting means connects the seatback-F, as well as arms 151, and therefore the tray table assembly, to seat base 101. Connecting both the seatback and the arms along a single axis readily permits a change in the angular orientation of seatback assembly 102, as to a floor 130, from an upright position, as shown for seat 100$w$, seat 100$x$, and seat 100$z$, to a reclined position, as shown for seat 100$y$, with tray table assembly 150 maintained in a closed position, and then further for such tray table assembly to be lowered to a predetermined limit, as shown for seat 100$x$ and seat 100$y$, such that a fully lowered table 153 will always then rest generally parallel to floor 130, as predetermined, regardless of the extent to which the seatback may be reclined. Otherwise, the angular orientation of the table as to the floor could be disadvantageously dependent on the angular orientation of the seatback to the floor.

When tray table assembly 150 is lowered, it makes apparent a lip 158, which is a planar section that runs along the seatback, between its sides and at the top of, and generally perpendicular to, flat back 105$f$. When a typical notebook computer is used by an aft passenger on table 153, it is typical for the hinged screen component of the computer to be rotated open such that its top edge is proximate to flat back 105$f$ near where it joins lip 158 of the seatback. In this mutual arrangement of the computer screen component and the seatback, a reclining movement of the seatback can substantially reduce the distance between the lip and table top 154 of the lowered table—as can be observed by comparing the illustrations of tray table assembly 150 behind seat 100$x$, which seat is upright, and the one behind seat 100$y$, which seat is reclined. In this scenario, if the aft passenger is not able to quickly rotate the screen component out from under the lip before the seatback has been reclined significantly, the lip of the reclining seatback may make contact with the screen component so as to essentially trap it. The screen component can be damaged by being forcibly flexed beyond its design limits if the seatback continues to be reclined and further reduce the distance between the lip and the table.

Also illustrated in FIG. 1 is a junction 180, a pertinent angle 181, and a reduced pertinent angle 181$r$. As can be perceived from the illustrated side viewpoint, the junction constitutes what essentially is a meeting point of each arm 151 and a portion of the seatback closest to it that rotates along the same axis, which for this seat are the outer side edge regions of flat back 105$f$. While generally such arms and edge regions, or comparable components of a differently styled seatback, are generally not constructed such that they are in actual direct-sliding contact with each other as a tray table assembly is lowered or raised into its closed position, the mutual actions of the corresponding arms and frame edges can be compared to those of two blades of a scissors.

From the side viewpoint as shown in FIG. 1, pertinent angle 181 relates the relative rotational angles of seatback 103$f$ and arms 151 when the tray table assembly has been lowered and the seatback-F is in its upright position.

Compare to angle 181$a$ reduced pertinent angle 181$r$ which relates the relative rotational angles of the seatback-F and arms 151 when the tray table assembly has been lowered and the seatback has been reclined to its predetermined limit.

As described in detail below, certain preferred embodiments of the invention allow an aft passenger, as deemed necessary, to substantially inhibit a reduction in size of pertinent angle 181 such that it does not approach or equal reduced pertinent angle 181$r$.

FIG. 1 also illustrates table axis 152, which is created by a conventional pivotable connection between table 153 and arms 151. A rotation of arms 151 on main axis 110 to a predetermined orientation as to the floor of the plane comprises part of the process of lowering tray table assembly 150 for use of its table 153. An additional part of the process comprises table axis 152 facilitating a rotation of the table to its own predetermined orientation as to the floor 130 of the plane.

FIG. 1 illustrates a number of spatial regions of passenger interest which are of relevance to the invention, namely initial region 201, expanded region 202, safety region 203, and add-on region 204. Safety region 203 may also be considered an aftward recline zone of the seatback—that is, an aft zone through which the seatback moves from a fully upright position to a fully reclined position at the predetermined angular recline limit. Also shown is an indicator of seat pitch 200. Seat pitch is a term that generally refers to the distance from a point on a seat to the same point on the seat in the next immediate row forward or aft. In the United States, seat pitch is generally stated in terms of inches, and while it is not a direct measurement of legroom, which is affected by the thickness of the seatback-F, it is often used as a proxy indicator for legroom.

As shown, initial region 201 is an approximation of the space available to a passenger between his seat and the seat immediately forward when both are in their upright positions. Expanded region 202 is an approximation of the space when region 201 has been enlarged by a seat being reclined to its predetermined limit while the immediately forward seat is maintained in its upright position. The difference between region 201 and region 202, from the perspective of the person who has reclined his seat, is add-on region 204. From the perspective of an aft passenger seated immediately behind such recliner, safety region 203 is an indicator of the extent to which the recliner has impinged upon the aft passenger's region of interest concerning his health, safety, and comfort. As thus stated, it can be seen that safety region 203 and add-on region 204 are equivalent in actual size.

The novel methods and devices of the invention help the aft passenger regulate movement of an immediately forward seatback-F into safety region 203.

It should be noted that due to the seat pitch often allocated by an airline, the airline's configuration of the recline limits of the seats, and the size of many passengers, especially the distance from their lower backs to their knees when they are seated, seats being reclined by some passengers often hit the knees of certain immediately aft passengers before such seats reach such recline limits. The novel methods and devices of the invention, if properly activated by such aft passengers, can help them protect themselves by inhibiting the reclining of seats before they are hit by such seats. Illustration of safety region 203 and reference to it being impinged upon is another way of referencing such knee-hitting concerns and other concerns of such certain aft passengers.

Conventional Recessed Seatbacks

In the context of this application, it is important to note that, in addition to the above-described conventional seat style comprising a flat back, there is a conventional commercial aircraft seat style that comprises a recessed back, as described below with reference to FIGS. 2 through 4. As will become apparent from certain descriptions thereafter, specific uses of certain methods and devices of the invention vary depending on whether a seat comprises the flat back or the recessed back.

Figure 2:
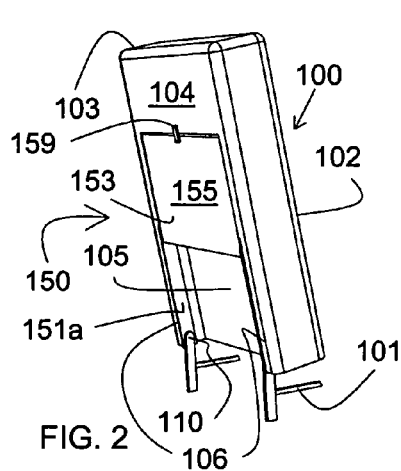
FIGS. 2 through 4 show perspective views of sections of a conventional seat—specifically its seatback assembly in upright and reclined positions with a tray table assembly closed, as well as in a reclined position with the tray table assembly lowered for use.
Figure 4:
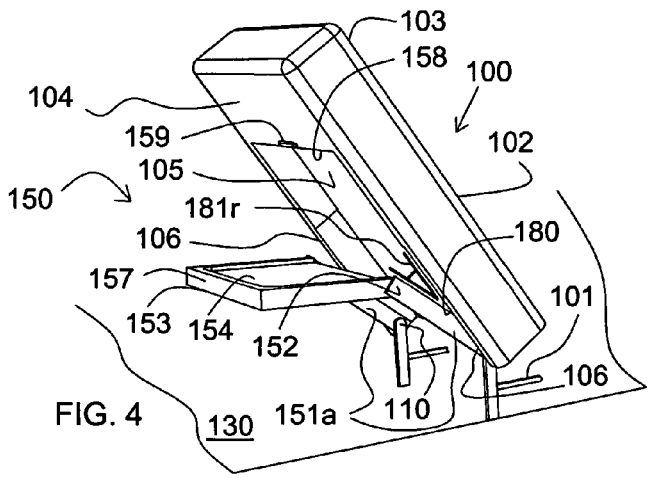
Figure 3:
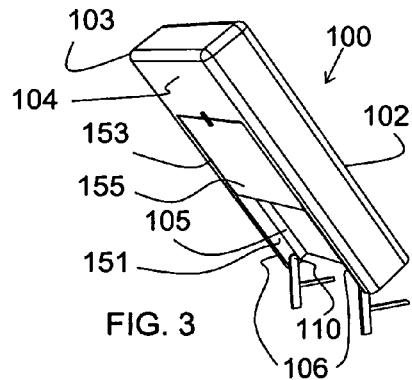

FIGS. 2 through 4 show perspective views of sections of a conventional seat 100. Seat 100 is generally comparable to seats 100x-z and comprises many comparable components. However, seat 100 is illustrated here separately because it comprises some parts that differ in ways that are significant to some aspects of the methods and devices of the invention.

In place of seatback-F assembly 102f, including its seatback-F 103f, of seat 100x, seat 100 comprises a seatback assembly 102, which comprises a seatback 103. Additionally, in place of the flat back 105f of seat 100x, seat 100 comprises a recessed back 105 whose recess is defined in part by frame edges 106, as well as by lip 158 which runs between such edges.

FIG. 2 shows seatback assembly 102 of seat 100 in an upright position with its tray table assembly in a closed position. FIG. 3 is distinguished from FIG. 2 in that the seatback assembly is in its fully reclined position. FIG. 4 is distinguished from FIG. 3 in that the tray table assembly has been lowered so that table 153 may be used as a table by an immediately aft passenger.

Rod Embodiment

FIG. 5 discloses a preferred embodiment of the invention, a rod 190. Such embodiment is employed by an aft passenger on a commercial airliner to help address concerns regarding health and safety. Prior art discloses integrated means for regulating reclining of seatbacks, including methods for their operation to allow seatbacks to be reclined. Prior art also discloses methods for applying an aft-directed reclining force to a seatback to facilitate its being reclined. Normally, a forward passenger seated in seat 100x first activates a selectable integrated, primarily internal seat recline regulation mechanism (not depicted) via an actuator specially located for access by the forward passenger, which when not activated prevents such seat from being reclined, and then exerts at least a predetermined level of the reclining force against seatback 103f.

This described recline process assumes that more recent prior art is not restricting reclining of the seatback, such as a prior art seat-recline lock-out means made available to aircraft personnel via specially-located actuating means for such lock-out means (not depicted). In other words, such prior art does not teach a means of such regulation being made available to the aft passenger.

FIG. 5 discloses use of rod 190 as a seat checking device as deployed by an aft passenger for inhibiting the reclining of seatback 103f.

The devices and methods of the invention will work effectively with seats of various configurations, including those comprising recessed back 105 and flat back 105f. As will be apparent to anyone skilled in the relevant arts and from a review of the text and drawings of the application, instructions provided to passengers regarding the actual placement of an embodiment of the invention in contact with a given seat may vary, depending on a seat's specific configuration, in order to provide the desired effectiveness of seat checking. As to the use of rod 190, according to an embodiment of the invention, with a seatback assembly comprising a drop-down tray table assembly, such variation in such instructions would not generally be necessary.

As shown in FIG. 5, rod 190 is placed parallel to flat back 105f, on top edges 151b of arms 151 of lowered tray table assembly 150, and proximate to junction 180 of the arms and the flat back. Placing the rod proximate to the junction—such that it is in simultaneous contact with the arms and the flat back—will inhibit the ability of someone to recline seatback assembly 102f and necessarily cause a reduction in pertinent angle 181, just as placing a steel rod at a junction of the two blades of a kitchen scissors would generally inhibit the bringing together of those blades in a typical scissors action.

The utility of the rod and certain other preferred embodiments of the invention set forth below is enhanced by a prior art rotational limit having been predetermined for tray table assembly 150—that is, when the tray table assembly is lowered, its arms can rotate towards an aft passenger only to an established limit. In turn, this restricts the maximum distance that may be achieved between the flat back and components of the tray table assembly 150, such as front edge 156 of the table or top edge 151 of the arm. Because of such limit, portions of the tray table assembly 150 can be employed as stable structures, or backstops, which can be used in combination with a device embodying the novel methods of the invention to regulate the reclining of the seatback-F should a reclining force be applied to such seatback.

The rod 190 having been formed to extend simultaneously to the top edges 151b of both arms and engage them, the rod is generally stabilized such that it is unlikely to fall to the floor from its position, even if there is no reclining force being applied to rod 190 at it areas of contact with the flat back. On the other hand, if another rod were positioned on only one arm of the tray table assembly the rod would have to be balanced in some fashion or fixed by means of some appendage to the rod; otherwise, it would be likely that the another rod would fall to the floor, even if such reclining force were being applied at the areas of contact with the flat back, and especially if no such force were being applied.

It might take only a relatively small force to move the rod along the arms 151 from the junction towards table 153 if such force were applied precisely in the direction of the length of the lowered arms away from the junction. Conversely, force applied to the rod perpendicular to the length of the lowered arms would inherently not tend to cause the rod to move along the length of the arms away from the junction. Even during an initial phase of an attempt to recline the seatback, the direction of the force applied to the rod is such that the rod is unlikely to displace it by moving it a significant distance along the arms, which would thereby, and in some relation to such movement, allow the seatback to be reclined.

If the rod were formed so as to include a covering that, when a force were applied that might otherwise tend to cause the rod to slide along the top edges of the arms and the surface of the flat back, would tend to actually cause a friction-type engagement for such rod with such top edges and such flat back, the likelihood of disadvantageous movement of the rod along the arms and away from the junction would be reduced.

It should further be noted that devices shaped comparably to the rod in length may be employed similarly. One such device would be an umbrella meeting certain requirements: Sufficient in length to more than span the distance between the two arms so as to be able to sit securely on top of the arms and beneficially engage a seatback as a forward passenger attempts to recline it, while not so long as to additionally cause an intrusion. One such intrusion would comprise entry into an aisle space whereby it might be bumped by a flight crew member, another passenger, or a beverage cart being rolled down the aisle. Another such intrusion would comprise affecting the operation of a seat other than the directly forward seat. And, another such intrusion would comprise entering into the legroom space generally considered as assigned to another passenger. In this regard, it should be noted that prior art umbrellas comprising a telescoping shaft could be employed to bring the umbrella to an appropriate length within these constraints. Alternatively, an umbrella could be specially sized to meet these length requirements. And, it would be beneficial for the umbrella to be constructed such that its function as an umbrella would not be damaged by its actual service as a seat checking device—that is, by being activated as a brace between the arms and the seatback-F.

U-Brace Embodiment

FIGS. 6 and 7 illustrate another preferred embodiment of the invention, namely a novel U-brace 170 which, like rod 190, is used to regulate the reclining of seatback 103$f$ when interposed between the seatback and a stable component of the tray table assembly.

FIG. 6 shows the U-brace in detail. The U-brace 170 comprises an adjustable post 174. It also comprises, appended to the post, a U-bracket 171 and a cross piece 175. The U-bracket 171 comprises a U-body 172 and appended U-legs 173, which are generally rigid and securely joined to the U-body 172. On the surface of the U-body that is between the U-legs is a surface U-bottom 172$a$, which in combination with the opposing faces of the U-legs, defines a U-space 176. Cross piece 175 is attached to post 174 at a substantial angle and with some general rigidity in order to promote the goals of the invention.

When U-brace 170 is activated according to the methods of the invention, the appendages of U-brace 170 broaden the areas of contact between the U-brace and the items between which it is interposed and therefore decrease the amount of force per square inch applied to such items, relative to what would exist if a simple post were used without appendages. As a result, the likelihood that the U-brace will stably maintain a position established for it by a user is increased, and the likelihood of the U-brace doing damage to the surfaces of such items is reduced, even when the U-brace is subjected to a reclining force.

FIG. 7 shows U-brace 170 in use as a device for regulating the reclining of seatback 103$f$. The U-brace is placed between lowered tray table assembly 150 and flat back 105$f$ of the seatback generally parallel to the floor of the plane. The U-brace is arranged so that a portion of table 153 is within U-space 176, especially such that U-bottom 172$a$ is in contact with front edge 156 of the table while U-legs 173 straddle the table, such that one U-leg is proximate to table top 154 and the other is proximate to table bottom 155.

At least one U-leg may be in contact with the table when the U-brace is in use. A main purpose of the U-legs is to serve as stabilizing means, that is to prevent U-bottom 172$a$ from coming out of contact with front edge 156 of the table once such contact is arranged by a user, until such time that the user seeks to manually move the U-brace.

With U-bracket 171 so arranged, a distal region of cross piece 175 is brought into contact with flat back 105$f$. This is facilitated by manipulation of adjustable post 174 such that it extends an adequate distance to make contact possible between the flat back and the cross piece. Adjustable post 174 comprises a conventional adjusting device, such as a set of a plurality of telescoping tubes which are arranged in a nested fashion, along with a locking mechanism (not illustrated) to fix the post at a length considered advantageous by the user. The locking mechanism must be strong enough to prevent a significant shortening of the post when a predetermined amount of force is applied to the U-brace via the flat back when a passenger seated in seat 100$x$ attempts to recline seatback 103$f$.

While U-bracket 171 is shown in use so as to prevent any reclining of the seatback-F, it can be adjusted, such as by the adjustable post being shortened, so as to permit partial reclining of the seatback-F that is less than its predetermined limit. In this way, an aft passenger seated directly behind seat 100$x$ whose legs would not be banged by the seatback-F if it were reclined, for example, a maximum of ten degrees from its upright position rather than a predetermined limit of, for example, 22 degrees, could work in concert with a passenger seated in seat 100$x$ to permit a 10 degree reclining, and no more.

FIG. 8 discloses an alternative use of the novel U-brace embodiment of the invention, namely its use to restrict reclining of seatback-F 103$f$ without it being interposed directly between two components of seat 100$x$. In this use, the ability of the seatback-F to be reclined is restricted irrespective of the lowering or closing of the tray table assembly, and even irrespective of whether seat 100$x$ includes a tray table assembly of the type described herein or any tray table assembly at all.

FIG. 8 shows a conventional briefcase 160 which comprises a case front 160$a$, a case bottom 160$b$, a case top 160$c$, a case back 160$d$, a case left side 160$f$, and a case right side 160$e$. The briefcase is placed on floor 130 directly in front of seat cushion 111 of seat 100$y$, such that a significant portion of a major planar component of the briefcase, e.g., case back 160$d$, is in immediate, significant contact with cushion front 111$a$.

Thereafter, adjustable post 174 is extended in length using conventional means, as discussed above, and positioned such that portions of U-bracket 171 can be brought in simultaneous contact with the briefcase at case front 160$a$ and case top 160$c$ while cross piece 175 is brought in contact with flat back 105$f$ of seatback-F 103$f$ of seat 100$x$, such that the U-brace is generally perpendicular, as between the case right side and the case left side, to the planes suggested by case front 160$a$ and flat back 105$f$, thereby restricting the ability of seatback-F of seat 100$x$ to be reclined. An attempt to recline seatback-F will exert reclining force on the U-brace along post 174 towards the briefcase; subject to the brace's structural integrity and design, that pressure will in turn be transferred to the briefcase; in turn, that will be transferred to the floor and the seat cushion of seat 100$y$, which are effectively stable structures.

When U-brace 170 is used in this arrangement, it can generally be comfortably oriented in a region that is straddled by the legs of the passenger seated in seat 10$y$. It can also be seen that this arrangement can be modified so that briefcase 160 is not employed and the U-bracket is brought into substantial, direct contact with seat cushion 111 of seat 100y, including significant contact with cushion front 111a, subject to the design of adjustable post 174 to be extended to advantageously span a distance from said seat cushion to the flat back.

U-brace 170 can also be adapted to be advantageously positioned between seatback assembly 102f of seat 100x and another component of seat 100y, such as its armrest, which is not illustrated here.

A stability-enhancing adaptation of U-brace 170 would entail an adaptation of U-bracket 171 such that the distance between its legs can be altered, that is, the distance made more narrow than an initial wide arrangement or made larger than an initial narrow arrangement, in order to complement the shape and size of the item against which it may be braced so as to enhance its connection with the item.

Another stability-enhancing adaptation would entail an adaptation of the U-bracket such that it is constructed of a material that is slightly deformable so that, when the U-brace is under force of a forward seatback which someone is trying to recline, the U-bracket will tend to achieve enhanced contact with the item against which it is braced and thereby be less likely to become dislodged from where a user has placed it.

Another stability-enhancing adaptation would entail an adaptation of U-bracket 171 such that it is constructed with U-legs 173 initially in close proximity to each other. In this adaptation, a stable structure against which the U-brace 170 is to be braced opposite the forward seatback assembly, in such a fashion that a portion of the stable structure item that will be located generally within U-space 176, can be forced between U-legs 173 so as to push them apart and such that they establish a grip of sorts on that portion of stable structure. This would allow the U-brace to maintain a stable connection with the stable structure even in the absence of the U-brace being in contact with a forward seatback assembly. Construction of the U-brace so that such a pushing apart of the U-legs and establishment of such a grip-like arrangement are possible can comprise a resistant hinge means, the use of an appropriately deformable material, or some other design readily apparent to someone with knowledge of the relevant arts.

Lip Brace Embodiment

FIGS. 8A and 8B illustrate another preferred embodiment of the invention, namely a novel lip brace 350, which is in some respects an adaptation of U-brace 170. Lip brace 350 comprises an appended hook 351, a lip wedge 353, and a telescoping shaft 352, which comprises a tightener 352a. Appended hook 351 comprises a receiver 354 and a leg 351a appended to hook 351, such leg comprising a leg front 351b. Hook 351 also comprises a hook bottom 351c and a hook face 351d. Additionally, leg front 351b and hook bottom 351c serve to define a space designated as a hook space 355.

Lip brace 350 is used to regulate the reclining of seatback 103f. The lip brace is interposed between tray table 153 of tray table assembly 150 and a portion of the seatback proximate to the location at which lip 158 joins flat back 105f. In order to facilitate the brace being interposed effectively in this fashion, tightener 352 is manipulated so as to allow telescoping components of telescoping shaft 352 to be adjusted readily such that the length of the shaft extends fully, and generally perpendicularly as to the planar surface of flat back 105f, from a junction of lip 158 and flat back 105f to an opposing portion of table 153. Such junction is engaged by lip wedge 353. Table 153 is engaged by appended hook 351, such that hook bottom 351c is in generally planar contact with table top 154 and leg front 351b of leg 351a is in generally planar contact with the table's front edge 156. In this arrangement, the hook space 355 is substantially filled by a portion of table 153.

It should be noted that receiver 354 is formed so as to adjustably receive shaft 352 at the shaft's end opposite lip wedge 353, in that the angle of the shaft may be adjusted relative to the plane defined by hook bottom 351c in order to accommodate different types and sizes of airplane seat assemblies. For example, the greater the distance between flat back 105f and front edge 156 when seatback 103f is upright and the tray table assembly is fully lowered, the more that shaft 352 must generally be moved generally towards the horizontal from its primarily vertical orientation when the brace is in use.

After the above-mentioned advantageous length of telescoping shaft 352 is established, tightener 352 is manipulated so as to securely fix such length of the shaft.

A reclining of seatback 103f necessarily reduces a distance between lip 158 and table 153. With lip brace 350 advantageously deployed as described, it will tend to restrict seatback-F 103f from being reclined because it serves as a brace against a reduction in the distance between lip 158 and table top 154.

A function of appended hook 351 is as a stabilizer, that is a device that helps lip brace 350 maintain the location of its contact with table 153, as such location is arranged by a passenger using the brace—when and if a reclining force is applied to seatback 103f and thereby to such brace—so as to allow the adaptation to serve effectively as a brace against reclining. If such appended hook or the like were not employed, so that the shaft's end opposite lip wedge 353 were brought into direct contact with table top 154, such reclining force could well cause the shaft's end to slide along the table top, leading to the lip brace being displaced and thereby failing. In order to enhance the stabilizing function of the appended hook, a stabilizing anti-skid element, such as a material with a substantial friction coefficient, can be applied to contact areas of hook bottom 351c, leg front 351b, or both such elements of the lip brace. Towards the same stabilizing anti-skid purpose, material with comparable attributes could be applied to portions of lip wedge 353.

Triangle Brace Embodiment

FIGS. 9 and 10 disclose another preferred embodiment of a seat checking device of the invention, a triangle brace 220, which is shown activated according to an embodiment of the invention in order to provide an aft passenger an ability to regulate reclining of a directly-forward seatback.

The triangle brace 220 comprises a number of components: a front component 221, which comprises a front surface 221a and a back surface 221b; an angled component 222 which comprises a top surface 222a, a bottom surface 222b, and a connecting surface 222c; a triangle base 223 which comprises a base top 223a, a base bottom 223b, and a plurality of adjustment holes 227; a generally rigid appendage designated as check 225 which comprises a check face 225a and a peg 225d; a connection 226; a proximal angle 226a, and a distal angle 226b.

Triangle brace 220 also comprises an L-space 230, defined by check 225 with its check face 225a and triangle base 223 with its base bottom 223b.

The triangle brace works in a fashion somewhat similar to that of the U-brace as depicted in FIGS. 7 and 8. As shown in FIG. 10, briefcase 160 is oriented such that its case right side is resting on floor 130, its major planar surfaces are parallel to the sides of the airplane, and a component of the briefcase, i.e., a case left side 160f, is facing up towards the plane's ceiling. Triangle brace 220 is placed on the briefcase such that the base bottom 223b is in substantial contact with the case left side 160f, check face 225a is in substantial contact with case top 160c, and front surface 221a is in substantial contact with flat back 105f, which also places a corner of the briefcase firmly within the L-space 230. This arrangement discourages reclining of seatback-F 103f of seat 100x.

While brace devices 170, 220, and 350 can be made from a variety of materials, including lightweight metals, they are likely to be made of a plastic or composite material so as to comprise components that are generally rigid and in turn be placed into use such that such components may be advantageously combined in a rigid fashion.

Additionally, triangle brace 220 can be constructed such that it can be folded from its generally triangular shape into a generally flat arrangement. This can be facilitated by constructing connection 226 such that it can be disengaged, thus allowing separation of connecting surface 222c of angled component 222 from back surface 221b of front component 221. Facilitation of such a flat arrangement would additionally entail constructing distal angle 226b and proximal angle 226a so that they each comprise a hinge, e.g., a so-called living hinge. Or, the triangle brace 220 may be formed so as to be readily separable into at least two pieces and securely reassembled. By incorporating such features, the triangle brace would allow ready conversion of it from flat to a generally rigid triangle, or vice-versa, by a consumer manipulating it appropriately.

As can be appreciated by someone with knowledge of the relevant arts, a device incorporating the teachings of braces 170, 220, and 350 can be adapted for an integrated connection to a piece of luggage, such as a suitcase or a briefcase, or to a notebook computer. The integrated connection could substitute for and serve the purpose of the above-described braces' appendages which are generally distal to the portion of the device making contact with the seatback.

Such integrated connection could comprise a pivotable hinge such that the device could be pivoted away from an external planar surface of the luggage in order to be placed into use against a seatback, achieving an orientation comparable to the one shown for adjustable post 174 in FIG. 8. It could thereafter be taken out of use, being pivoted back into flat proximity of such planar face of the luggage. Alternatively the connection could comprise complementary plug-in components of the device and the luggage, such that, for example, the device could be plugged into a receiver which has been attached to the luggage.

It should be noted that triangle brace 220 may incorporate additional stability enhancing attributes to help it stay where it is placed on the briefcase whether or not it is encountering pressure caused by someone trying to recline seatback-F 103f. Such a stabilizing attribute could include an extension of the length of triangle base 223 along case side 160f. Such a stabilizing attribute could include an extension of the width of the triangle base. Both of these extensions could help the brace 220 maintain its advantageous contact with briefcase 160, irrespective of whether reclining force is being applied via seatback-F.

Safety Stop Embodiment

Figure 15:
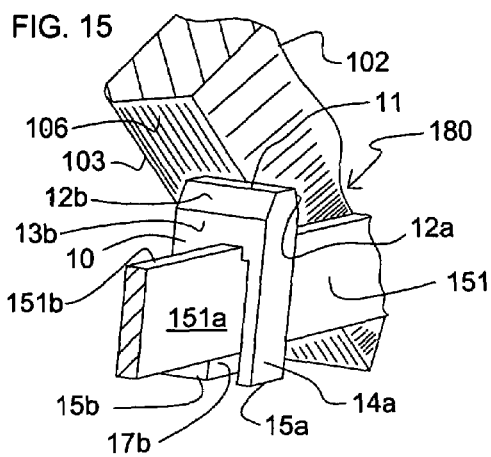
FIG. 15 shows a detailed view of a portion of FIG. 14.
Figure 15A:
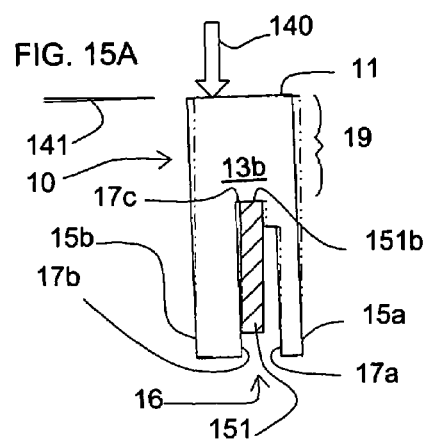
FIG. 15A illustrates a direct front, cut-away view of the embodiment of FIG. 11 as shown deployed in FIG. 15, where it is properly oriented on a tray table arm of the seat, as well as an impact of such proper orientation.
Figure 15B:
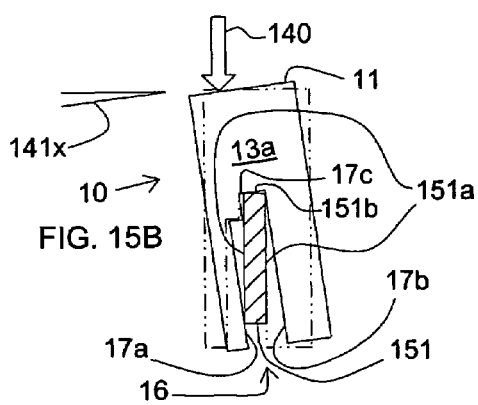
FIG. 15B illustrates a direct front, cut-away view of the embodiment of FIG. 11 as shown deployed in FIG. 15, except that here it is shown improperly oriented on a tray table arm of the seat, as well as an impact of such improper orientation.

FIG. 11 depicts another preferred embodiment of the invention, namely a safety stop 10. FIGS. 15A and 15B, as discussed below, show direct-front views of the safety stop 10 located on cut-away sections of tray table arm 151.

The safety stop 10 comprises a body 19 to which are securely appended a thin leg 15a and a thick leg 15b.

The safety stop 10 additionally comprises a top 11 and a bottom 18, and its legs 15a and 15b provide definition for a space, designated as channel 16.

The safety stop 10 is designed to generally maintain on arm 151 an operational location at which it has been placed by a user, notwithstanding forces that may be brought to bear upon it which were not applied by the user.

The thick leg 15b comprises a thick face 14b and a thick wall 17b. The thin leg 15a comprises a thin face 14a and a thin wall 17a. The thin leg 15a further comprises a step structure 20, which step structure 20 comprises a step tread 20a and a step wall 20b.

Top 11 comprises an A-bevel 12a and a B-bevel 12b.

Safety stop 10 further comprises an A-surface 13a, a B-surface 13b, and a top wall 17c.

Safety stop 10 is formed to engage an arm of a tray table assembly after such assembly has been lowered from a closed position. Such engagement comprises the legs of the stop straddling arm 151, with the arm being within channel 16 of the stop, at an advantageous location along the length of the arm and in an advantageous orientation relative the arm. Stop 10 is further formed to promote stability of such engagement generally notwithstanding the effects of typical air-turbulence-jostling, reclining of a seatback associated with the tray table assembly, or other man-made force or gravitational forces. In other words, as with other embodiments of the invention, stop 10 incorporates features to enhance its ability to stay put once it is placed for operation by the user.

For example, while it can be beneficial to minimize the stop's overall size to make it conveniently small for a user to carry along between uses, stop 10 is formed with a height from bottom 18 to step tread 20a and a depth from A-surface 13a to B-surface 13b that is adequate to provide a significant surface area of thick wall 17b. When the device is placed on the arm, the thick wall comes into contact with one of the sides 151a of the arm, and so the size of the significant surface area of the thick wall affects the ability of the stop to achieve advantageous frictional resistance, against the arm, to help it resist being pushed from where a user has placed it on the arm—in other words, against being defeated by being pushed along the arm, away from junction 180, should a reclining force be applied. Additionally, said height is formed to be adequate to prevent the device from being forcibly rotated off of the arm. These size features enhance the ability of the stop to achieve a stable engagement with the arm.

While the novel disclosed design of the safety stop 10 comprises a number of advantageous elements, alternative embodiments may be configured differently, for example by comprising fewer such elements, alone or in combination with other beneficial elements.

Various tray table assemblies used in commercial airliners are produced with arms of various thicknesses. If channel 16 were created in a simple rectangular shape and wide enough to complement thick arms, it would tend not to hold its position when placed on narrow arms and contact was made with it by a reclining seatback. If such a simple channel 16 were created narrow enough to properly complement a thin tray table arm, then it would not fit at all on a thick tray table arm. Such a non-accommodating embodiment comprising a simple channel 16 can be considered advantageous in that such a novel device of the invention could be made more simply, perhaps being formed so as to be smaller, and be adequately effective for someone who intends to use it on aircraft comprising seat assemblies which comprise tray table arms of thicknesses that are generally uniform, from one plane to another. For many consumers, however, a device which can accommodate myriad seat assemblies—with arms of various thicknesses—would be preferable.

Figure 17:
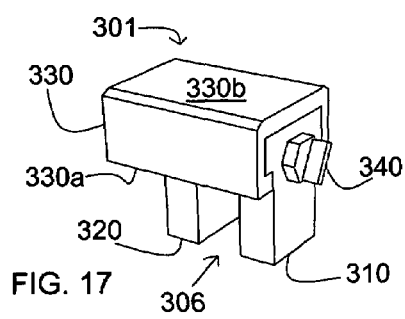
FIG. 17 shows a perspective view of another embodiment of the invention comprising movable parts which can be used to regulate the reclining of a seatback.
Figure 18:
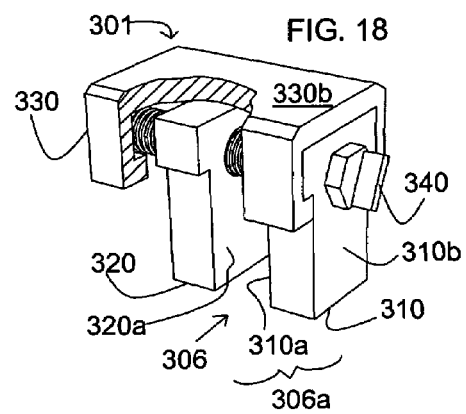
FIG. 18 shows a partial cut-away perspective view of the embodiment shown in FIG. 17.

An adjusting means employing a tightening device could be added to the safety stop to help accommodate arms of various thicknesses by, subject to the flexibility of the material from which the stop were made, facilitating an inward movement of portions of the legs towards each other with the tray table's arm in between the legs. A clasp in the form of a spring clamp could be adapted to cause and maintain such inward movement. Or, for adjusting means components of the safety stop could be movably joined and employ a tightening device to right-size the device for a stable engagement with the arm. An embodiment of this latter approach is illustrated in FIGS. 17-19 and is described below. However, as an adjusting means in the present preferred embodiment, thin leg 15*a* is formed with step structure 20 within channel 16, thereby creating an alternate effective distance between the thin leg and thick leg 15*b*, specifically between thick wall 17*b* and step wall 20*b*, so that stop 10 can be adjustably right-sized to stably engage arms of different thicknesses within two ranges of arm thicknesses.

For an arm with a thickness within one of said ranges which is the thicker of the two ranges, a user would right-size the stop by placing it on the arm with thick wall 17*b* and thin wall 17*a* each being immediately proximate to an opposite side 151*a* of the arm, while step tread 20*a* of the stop would be immediately proximate to top edge 151*b*. For an arm with a thickness within the other of said ranges which is the thinner of the two, a user could place the stop on the arm so as to generally create an engagement that comprises a similar matching of elements of the stop and the arm, as just described. However, the ability of novel stop 10 to promote the purposes of the invention can be enhanced if it is right-sized as it is engaged with the arm. Such right-sizing of stop 10 comprises placing the stop so that the arm is confined between walls of the stop that oppose each other at a distance that most closely complements the thickness of the arm, with said distance being adequate to advantageously receive the arm. So, for such an arm within said thinner range, as shown in FIG. 15 the stop is arranged so that thick wall 17*b* and step wall 20*b* are each immediately proximate to an opposite side 151*a* of the arm, while top wall 17*c* of the stop is immediately proximate to top edge 151*b*.

Safety stop 10 can alternately be formed to comprise a plurality of step structures as depicted in FIG. 12 and described below. For a stop specifically intended for use on the arm of a tray table, such a plurality would likely comprise fewer than 15 step structures. Alternately, an embodiment could incorporate what essentially is an infinite number of steps, namely what would appear to be a sloped surface within channel 16 instead of a series of visually and structurally distinct step structures as shown in FIG. 12.

The safety stop can be made of metal, such as extruded aluminum or other metals, by molding, milling, or extrusion. It can also be made of generally rigid plastics, such as nylon and high-density polyethylene, formed by molding, milling, or extrusion. Plastics which can be slightly deformed when a force likely to be applied via a reclining seatback is applied—in other words, which can flex to a limited extent—can especially aid the stop to achieve a beneficially close fit on the arm. One such plastic is low-density polyethylene. Using generally rigid, yet somewhat deformable materials to form the safety stop, especially in the region of body 19, the thin leg and the thick leg can be formed to be susceptible to being resiliently dilatable via force applied by the user's hand as the stop is placed on the arm,—causing the distance between stop 10's thick wall 17*b* and both opposing walls, step wall 20*b* and thin wall 17*a*, to be temporarily enlarged. Then, after the stop is advantageously placed on the arm, such force can be remove to allow said distance to change towards its prior state, thereby allowing the stop to tend towards gently squeezing the arm. This is another way in which the stop can be right-sized.

Alternatively, to allow such temporary enlargement and subsequent return to an initial distance, the stop can be formed with a hinging mechanism as a component of body 19 or where one of the legs is connected to the body.

The device may also comprise at least one of a variety of methods which can tend to enhance surface friction between the surfaces of the arm 151 and the surfaces within channel 16 with which they may come into effective contact. Such methods comprise, for example, such surfaces of the stop being formed to be advantageously rough, such as by forming them with multiple small cuts or with small bumps in the material, or by milling, by the moulding process, or by application during the moulding process of a secondary material comprising such characteristics, such as a rubber overlay. Such methods also comprise components incorporating a relatively high-friction surface being securely affixed to the channel's surfaces. Such methods also comprise using a fabrication material for the device that, subject to the manner in which it is processed, comprises surfaces which exhibit relatively high frictional coefficients; such processing may include molding, milling, extrusion or other conventional process understood by those knowledgeable of the relevant arts. One such fabrication material is low-density polyethylene, which, especially when milled, can exhibit significant friction attributes when brought into contact with conventional tray table arms and a sliding force is then applied. Some urethanes also exhibit these attributes, as do other materials which may be advantageously employed. Some combination of the above may be employed, as may other techniques known to those knowledgeable of the relevant technologies.

It should be noted that whatever material is chosen for fabrication of the stop, it should be robust enough able to withstand the reclining force that may be applied to it via a reclining seatback without the stop's purposes being defeated. For example, a material might be chosen with advantageous friction attributes which nevertheless, when such force is applied, will fail in that the thin and thick legs will be forced apart or will in some other way be deformed to such an extent that the stop will be forced out of the way of the seatback rather than stopping the seatback. Also, it may be found to be advantageous to use a plurality of materials to form various portions of the safety stop, and from such portions the complete safety stop may be formed.

The depicted safety stop embodiment generally operates to maintain an arranged position on arm 151 through interaction of the safety stop with the arm even when rearward force is applied at an area of contact of the seatback with the safety stop—that is, force directed more towards tray table 153 than towards junction 180. In addition, bevels 12a and 12b, alternately, serve to promote the stop's stable engagement with the arm. First, the bevel will tend to direct any force applied to the safety stop via a reclining seat so that the stop is pressed generally against the arm rather than along it, that is vertically rather than horizontally relative to the arm if the arm is considered to be generally horizontal. Second, taking into account the typically upholstered surface of seatbacks, when used on certain seat assemblies the bevels help create an advantageously increased area of contact for the safety stop where it meets the seatback. When force is applied via a reclining seat, the fabric tends to engage the safety stop such that it tends to enhance the stops stability. As noted above, it is not essential that every element of safety stop 10 disclosed herein be included in an embodiment for it to be effective.

FIG. 12 depicts a multi-step stop 10a. This embodiment, comprises a plurality of step structures 20. Such plurality of step structures increases the likelihood that, for any tray table arm thickness likely to be encountered by a traveler, stop 10a will comprise a complementary pair of opposing walls to advantageously confine the arm—such as between thick wall 17b and thin wall 17a or between thick wall 17b and a step wall 20b of one step structure of the plurality of step structures. Such plurality or step structures provides an adjusting means that enhances the ability of stop 10a to be right-sized for tray table arms of different thicknesses within a corresponding plurality of ranges of complementary thicknesses, plus one.

Multi-step stop 10a also comprises a cut-away 24. Such cut-away reduces the size and, for a given material, the weight of stop 10a, and it also reduces the likelihood that what might be referred to as the cut-away portion of the stop would have otherwise disadvantageously come into contact with a component of a forward seat so as to interfere with the activation of stop 10a on arm 151 before the stop is brought into contact with the seatback when such seatback is in an upright position. Unless otherwise indicated explicitly or by context, stop 10a is generally deployed advantageously by a user as is safety stop 10.

It is to be noted that when a description of a device herein indicates that it can be right-sized for engagement with one or more other objects, that expression embodies a special meaning. Right-sizing a device is a process of adjusting it so that its engagement with such other object or objects is advantageously stable. In some instances, right-sizing may facilitate a fit between the two that is tight and may even comprise the device squeezing the object. However, the goal is not a tight fit for its own sake but rather it is stability, and stability can be achieved in some instances even when the receiving component of the device somewhat loosely fits the component of the other object with which it is engaged. Overall, the closer the fit, without being too small, the better the stability.

Right-sizing means comprise one or more components of an embodiment that enables the embodiment to work effectively in situations comprising different critical dimensions—such as tray tables that have different thicknesses and seatback assemblies that have different distances from the flat back of the seatback to the front edge of the tray table. Such right-sizing means may comprise a movably adjustable component of a device, that is a component whose position relative to another component of the device can be dynamically changed and then generally temporarily fixed, as with certain components of lip brace 350 depicted in FIG. 8A and certain components of moving-part stop 301 depicted in FIG. 18.

Right-sizing means may comprise one or more certain static-adjustable elements. Stops 10 and 10a comprise such one or more static-adjustable elements in that they comprise at least one step structure that provides a means by which the effective distance between the stop's legs can be adjusted to engage arms with thickness within more than a single range of thicknesses depending on how a user places the stop on the arm. So, a stop with one step structure can be adjusted for two ranges of arm thicknesses, while a stop with eight step structures can be adjusted for nine ranges of thicknesses because of the right-sizing means that are the step structures in combination with the walls.

On commercial aircraft currently in use, the thickness of tray table arms, for the style of drop-down tray table assemblies depicted herein, generally varies between approximately 0.25 inches and 0.75 inches. Therefore, the distance between thin wall 17a and thick wall 17b can be advantageously formed at a distance of just slightly less than 0.75 inches.

To accommodate an arm that is approximately 0.25 inches thick, the distance between thick wall 17b and the step wall 20b closest to top wall 17c can be formed at a distance of just slightly less than 0.25 inches.

To generally aid in the accommodation of arm thicknesses between 0.25 inches and 0.75 inches, the multi-step stop 10a depicted in FIG. 15 comprises step structures 20 which comprise step walls 20b that are approximately 0.09 inches in height and step treads 20a that are approximately 0.06 in width. Accommodation of various arm thicknesses can also be aided by forming stop 10a of a slightly deformable material and with a design such that (i) the device is resiliently dilatable, in that a user can manually slightly enlarge the distance between thick wall 17b and opposing walls of the stop within the channel, yet (ii) the device will be able to adequately withstand an application of reclining forces. By temporarily enlarging such distance, then placing the stop on a tray table's arm such that such distance between a set of such opposing walls will only temporarily allow ready positioning of the arm between them, and then allowing the stop to return to its original shape, a user can aid in the right-sizing of the fit. In other words, for such a device its resiliently dilatable feature is a right-sizing means.

Overall, the distance between bottom 18 and top 11, as depicted, is 2.25 inches, while the distance between bottom 18 and top wall 17c is approximately 1.6 inches, leaving a height of body 19 of approximately 0.7 inches. The width of stop 10a, between thin face 14a and thick face 14b, can be advantageously formed to be 1.6 inches, while its length, from A-surface 13a to B-surface 13b, as depicted is approximately 1 inch.

Such dimensions are not critical to the operation of the embodiments. For, example, the length from surface 13a to 13b could be within the range of 0.4 to 2 inches.

Each of these measurements of the depicted embodiment entail compromises between a plurality of concerns. Among such concerns is a desire to form the stop as a small device to make it convenient to carry and to minimize the cost of its manufacture. Another such concern is a desire to make the stop structurally sound so that it will neither be disadvantageously deformed nor be caused to fail when withstanding a force applied at an area of contact with a seat someone is attempting to recline.

Another such concern is a desire to create areas of direct contact between stop 10a and arm 151 that are large enough so that, should someone attempt to recline a seatback with which the stop is in deployed contact, friction between the stop and the arm will help the stop maintain its engaged location.

Aspects of Activation of the Safety Stop

FIG. 13 depicts safety stop 10 being activated to help protect an aft passenger seated immediately behind seatback 103. FIG. 14 provides a close-up, sectional view.

An activation of the safety stop comprises placing it on tray table arm 151 of lowered tray table assembly 150 such that a portion of the arm is within channel 16, with legs 15a and 15b straddling the arm and with top wall 17c generally in contact with top edge 151b. As depicted, the stop has been placed down along the length of the arm towards junction 180 until a portion of A-bevel 12a comes into substantial contact with frame edge 106. This activation of the novel device will tend to maintain the size of pertinent angle 181 in spite of a reclining force being applied to seatback 103. In other words, the safety stop helps an aft passenger seated aft of seatback 103 establish protection from undesirable contact being made by the immediately forward seatback 103. This can also help the aft passenger maintain for himself an adequate amount of room to perform certain leg exercises designed to promote good blood circulation in his legs and as a prophylactic undertaking against deep vein thrombosis—to the extent that such room exists while seatback 103 is in an upright position and the aft passenger is seated in an aft seat assembly. It can also help such an aft passenger protect a child which he may be holding on his lap or may have positioned on his lowered tray table. It can also help such passenger protect his head from being hit while he is bent over in order to retrieve something from his carry-on luggage which has been stowed at his feet. It can also help such passenger protect his notebook computer from having its screen broken if forceful contact were made by a reclining seatback.

It should be noted that thick leg 15b is responsive to the fact that there is substantial variance in the distances between tray table arms and proximate portions of seatbacks, such as frame edge 106, with which the safety stop can make advantageous contact in order to serve the objects of the invention. While the use of two thick legs can be desirable, a second thick leg can disadvantageously interfere with other components of seat 100 or components of an adjoining seat. Or, contact between such a second thick leg and at least one of said components could occur such that it would not be possible to advantageously locate the stop on the tray table's arm so as to help provide the intended protection. And, including a second thick leg would require an additional volume of material to manufacture the stop.

A device embodying the teachings of the invention should preferably either account in its design for differences in shapes and sizes of seat components and distances between them, a set comprising a plurality of stop devices should be supplied to a passenger, or a stop device should be customized for individual types and styles of seats and the passenger made aware of the limited number of seat types on which it can be effective.

It should also be noted that by placing safety stop 10 on the arm at some distance from junction 180 such that the stop does not make initial contact with the seatback while the seatback is in its upright position, a rearward passenger can thereby allow the seatback of the forward passenger to be reclined partially until such contact is substantially made. This use of the stop may be appropriate for a person whose health or safety do not require that a forward seat be essentially completely prevented from reclining.

It should additionally be noted that the safety stop device can be adapted so as to comprise a plurality of such safety stops to be used in combination—such as by employing a pair of safety stops, one on each arm of the tray table. Among other features of this approach is that, as with the embodiment illustrated in FIG. 5, reclining of the seat will be opposed at two regions of rearward portion 104 of the seatback. In turn, for a given amount of rearward force, this will tend to reduce the amount of such force applied to each safety stop and thereby, for a given embodiment of the safety stop, reduce the possibility that the function will be defeated. Such an adaptation would also reduce the likelihood, for a given amount of force, that the legs of a stop will be caused to move apart. Such an adaptation would also, for a given amount of force, tend to reduce the amount of force applied to any one component of the tray table assembly and would tend to enhance overall stability.

FIGS. 15, 15A, and 15B help explain a design element of the safety stop.

FIG. 15 shows an even more detailed perspective view of the safety stop 10 as shown in FIG. 14. As can be discerned from FIG. 15, when safety stop 10 has been deployed on arm 151 of seatback assembly 102, proximate to junction 180, frame edge 106 will make contact with the safety stop proximate to a portion of its surface region designated top 11. When considering safety stop 10 from top 11 to bottom 18, said region can be seen to be above thick leg 15b.

When an attempt is made to recline seatback 103, force is consequently applied to safety stop 10. As illustrated in FIG. 15, such force is applied at a surface portion of top 11 that is not directly above, that is not at a common latitude with, top wall 17c, which is a surface portion of the safety stop that is in contact with top edge 151b of arm 151. As a result of the location at which such force is applied relative to the location of the top wall 17c and its contact with arm 151, such force will tend to encourage the safety stop to rotate in relation to arm 151 towards the side at which the force is applied, with an area of contact between top wall 17c and arm 151 generally serving as an initial axis. Certain features of the safety stop, when it is properly deployed on arm 151, will tend to discourage such rotation, as is further described below with reference to FIGS. 15A and 15B.

FIGS. 15A and 15B show safety stop 10 on an isolated section of arm 151. The safety stop has been placed on the arm 151 of the tray table assembly such that the arm is within, in a complementary fashion, channel 16 and at least a portion of top edge 151b of the arm is in contact with top wall 17c.

Depicted is a downward force 140 which, for purposes of this immediate discussion regarding the potential for a disadvantageous rotation of safety stop 10 relative to arm 151 of tray table assembly 150, suggests the force that will be applied to the safety stop when it is deployed on the arm, as depicted in FIGS. 13, 14, and 15, and thereafter appropriate force is applied to seatback 103 in an effort to cause the seatback to become reclined. Phantom-line outlines in FIGS. 15A and 15B indicate positions of safety stop 10 when first deployed on arm 151, prior to an attempt to recline the forward seatback and the resulting application on the safety stop of downward force 140.

Depending on the specific design of the seats and tray tables utilized on a particular airplane, when a seatback is reclined it will make substantial initial contact with, and apply force at, a portion of top 11 that is proximate either to A-bevel 12a or B-bevel 12b, such portion being located generally either between the two arms of the tray table or outward of said arms.

When a seat comprises a seatback assembly 102, which comprises a recessed back and frame edges, such initial contact is intended to be made generally outward of such arms, as is illustrated in FIGS. 13, 14, and 15. When a seat comprises a seatback-F assembly 102f, with its flat back 105f, then such initial contact is intended to be made generally inward of such arms. In general, such an initial contact, and the resulting preponderance of downward force 140, will not be directly overtop edge 151b of arm 151 and top wall 17c of safety stop 10.

In order to discourage disadvantageous rotation of the stop on the arm when the downward force is applied, for a stop that comprises at least one step structure so as to accommodate arms of some variety of ranges of thicknesses, the stop should be oriented on the arm such that the force is applied generally over the thick leg of the stop—or, more generally, above the leg whose wall within channel 16 is opposed to any step wall within such channel. In this orientation, application of downward force 140 will tend to bring thick wall 17b against side 151a of the arm, thereby tending to arrest further rotation as well as tend to enhance potential surface friction between thick wall 17b and a side 151a of arm 151. This dynamic is suggested in FIG. 15A, which shows a rotation angle 141, generally denoting the angle of the planar surface of top wall 17c relative to the planar surface of top edge 151b of arm 151 when such downward force is applied.

FIG. 15B shows what can happen when the safety stop is deployed in an incorrect orientation on the arm. In such incorrect orientation, when downward force 140 is applied, it tends to cause significant rotation of the stop, beyond that depicted in FIGS. 15A—in FIG. 15B, indicated by a rotation angle 141x. This rotation could extend to a point at which the stop becomes disadvantageously moved by such force from where the stop was initially placed on the arm by its user. Such incorrect orientation combined with such downward force could, potentially, ultimately engender the stop being substantially deformed and rotated to such an extent that the seatback could bypass the stop and thereby allow a seatback against which the safety stop had been deployed to be reclined to an extent greater than that desired by a user of said stop.

Even short of the stop being caused to substantially deform and rotate to the point that it can be bypassed, rotation to an extent generally indicated by rotation angle 141x, as depicted in FIG. 15B, will tend to significantly reduce the total surface area of contact between wall surfaces of the stop within channel 16 and surfaces of sides 151a and top edge 151b of the tray table's arm, which will consequently tend to reduce the potential friction of the stop against the arm when a reclining force is applied to the stop, thereby reducing the ability of the stop to resist being moved along the arm by such force, away from junction 180, and thereby resulting in a reduction in the effectiveness of the safety stop in that it will not regulate reclining of the immediately forward seat as intended by the user.

As can be seen, it is advantageous for step structures, which are employed to allow accommodation of the width of the channel to arms of various widths, to be located all towards one side of the safety stop's channel 16, such side being opposite to the one at which downward force may be applied by a seatback someone is attempting to recline, in order to discourage increases in the rotational angle when the stop is placed in its desired location on the tray table's arm and such downward force is thereafter applied to said stop.

If contact of the seatback and the stop will be made most substantially within the arms of the tray table, such as with a flat-back seat, and the stop is placed on the left arm, the stop should be oriented on the arm such that B-surface 13b is facing forward. If contact will be made outward of the arms, such as with a seat comprising a recessed back and frame edges, and the stop is placed on the left arm, then A-surface 13a should be facing forward.

It should be noted again that some deforming of the stop and some level of rotation of the stop on the arm can occur without the purposes of the stop being defeated.

It should also be noted that if the thickness of the arm were such that it would be too wide to fit between step wall 20b and thick wall 17b of safety stop 10, according to the teachings of the invention, it might be susceptible to being alternately placed between thin wall 17a and thick wall 17b of said safety stop, with at least a portion of step tread 20a in direct contact with at least a portion of top edge 151b of the arm.

Alternate Stop Embodiment

Figure 16:
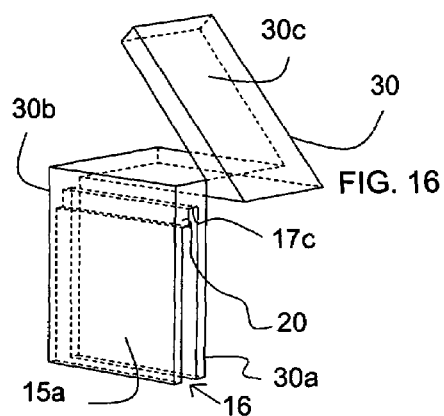
FIG. 16 shows a perspective view of a hidden line illustration of another embodiment of the invention.

FIG. 16 depicts an alternate safety stop 30 of the invention, which is an adaptation of safety stop 10. The alternate safety stop comprises thin leg 15a, step structure 20, and top wall 17c. It also comprises a second thin leg 30a which, in combination with thin leg 15a provide a definition for channel 16. The alternate safety stop also comprises a top section 30b and, appended thereto at a generally right angle, a wedge 30c.

If one overlooks step structure 20, thin leg 15a and the second thin leg 30a are of similar thicknesses. In this embodiment, thick leg 15b of safety stop 10 is replaced by the second thin leg 30a and the wedge 30c. Safety stop 10 requires the relative thickness of the thick leg in order to account for any lateral gap between arm 151 on which the stop has been placed and the portion of the seatback with which the stop must make contact in order to inhibit its being reclined. In FIGS. 13 and 14, the lateral gap at issue is any that may exist between arm 151 and frame edge 106. The alternate safety stop generally accounts for any such gap with its wedge, which protrudes from the side of the top section, that is, generally perpendicular to the planar orientation of channel 16 and sides 151a.

As has been described, safety stop 10 can be placed on an arm of a tray table alternately in two orientations, 180 degrees offset from each other. In order to achieve an object of the invention, the orientation should preferably be as shown in FIG. 15A. To achieve this, if its initial orientation is not correct, the safety stop 10 may be re-situated at 180 degrees on the arm on which it had been placed or it may be kept in its general orientation and moved to the other arm of the tray table assembly. Alternate safety stop 30 cannot be re-situated in this way. Rather, on a given style of seat, whether comprising a flat back or a recessed back, stop 30 can only be properly placed on one arm of the tray table or the other if it is to achieve an object of the invention—namely, to regulate the reclining of a forward seatback.

Because the walls of the alternate safety stop are relatively uniform in thickness, certain types of production used to form the stop may be simplified in comparison to those used to form safety stop 10. This safety stop can be produced of plastic or metal using a molding process, for example, or it may be formed by extrusion combined with other production processes.

Moving-Part Stop Embodiment

FIGS. 17, 18, and 19 show another embodiment of the seat checking device of the invention, namely a moving-part stop 301 which can be used to regulate the reclining of a seatback. FIG. 17 offers a perspective view, FIG. 18 offers a perspective view with a partial cut-away, and FIG. 19 offers a partially exploded, hidden-line perspective view from below the moving-part stop.

The moving-part stop comprises a T-body 330, appended to which are a fixed T-leg 310 and a movable T-leg 320. The moving-part stop also comprises a tightening device 340.

Fixed T-leg 310 comprises an inner face F 310*a*, an outer face F 310*b*, a top portion F 310*c*, and an unthreaded hole 312, while movable T-leg 320 comprises an inner face M 320*a*, a top portion M 320*c*, and a threaded hole 322.

T-body 330 is formed so as to define an engagement space designated as T-slot 331. The T-body further comprises a bottom surface 330*a*, an outer surface 330*b*, a closed end 330*c*, and an open end 330*d*. Tightening device 340 comprises a threaded portion 342 and a knob 341, the latter comprising a knob face 341*a*.

As illustrated, the opposing faces of the T-legs of the moving-part stop, along with bottom surface 330*a*, suggest a space designated as adjustable channel 306.

Movable-part stop 301 comprises adjustable leg components susceptible to having the distance between them manually altered by a user in order to right-fit stop 301 for the an arm of a tray table.

As illustrated, T-legs 310 and 320 are formed such that their top portions 310*c* and 320*c* complement the shape of T-slot 331 defined by T-body 330. This complementary arrangement permits creation of a special engagement of the T-legs at their top portions with the T-body, wherein the T-legs may be securely, slidably affixed with the T-body such that the only way to end this engagement is to slide such T-leg forward in the same direction it was moved to start the engagement or back it out in the opposite direction.

Fixed T-leg 310 is engaged in the above described fashion with the T-body such that its outer face F 310 is generally in the same plane as closed end 330*c*, whereafter the two are securely affixed to each other so as to prevent movement between them. Then, in the above-described fashion and starting from open end 330*d* of the T-body, movable T-leg 320 is engaged with T-body 330 so as to be slidably affixed to each other. At this juncture adjustable channel 306 is defined.

Next, threaded portion 342 of tightening device 340 is inserted into unthreaded hole 322, which hole has been formed to be large enough to allow smooth passage of the threaded portion but small enough such that knob 341 cannot pass through it.

Next, tightening device 340 is manipulated by its threaded portion being pushed through hole 312 until it makes contact with movable T-leg 320, whereafter it is advantageously aligned and then turned in a clockwise direction so as to become engaged with threaded hole 322.

At this juncture, with knob 341, at its knob face 341*a*, being in contact with outer face F 310*b* of fixed T-leg 310, the distance between inner face M 320*a* and inner face F 310*a* will be decreased by additional turning of the tightening device in a clockwise direction. Conversely, by turning the tightening device in a counter-clockwise direction, while contact is maintained between the knob face and the outer face F, the distance between faces 310*a* and 320*a* of the two T-legs will be increased. Such clockwise and counter-clockwise manipulations will make more narrow or will widen movable channel 306.

By appropriately turning the tightening device, the movable channel is first made large enough to allow the stop to be placed on the tray table's arm such that the bottom surface of the T-body is in contact with top edge 151*b* of the arm and the legs straddle the arm. After the moving-part stop is slid into place against rearward portion 104 of the seatback, the tightening device is then turned clockwise so that inner face M of the movable T-leg and inner face F of the fixed T-leg are in substantial contact with opposing sides 151*a* of the arm. Thereafter some additional clockwise turning force is applied to the tightening device in order to grab onto the arm with enough pressure to generally maintain the stop's position on the arm in spite of any rearward force that may be applied if the person seated ahead attempts to recline his seat. The amount of turning force and resulting grabbing pressure will vary depending on a number of factors, including friction attributes, in combination, of the arm and the inner faces of the T-legs.

It should be apparent that the fixed T-leg and the T-body can be formed, such as by a molding process, as a unified piece rather than as two separate pieces. It is anticipated that the moving-part stop will be formed of one or more plastic or composite materials, though some or all of its elements may be formed of one or more metals.

It should also be noted, as will be apparent to someone knowledgeable of the relevant art, that the moving-part stop can be adapted so as to replace the component shown here as a tightening device with another component. What is important is that a device be employed that helps the moving-part stop maintain its position on a tray table arm, as selected by a user, even if force is applied thereafter to the stop in an event that a forward passenger attempts to recline his seatback.

As described above, it can be seen readily that both safety stop 10 and moving-part stop 301 incorporate a stabilizing structure which enhances their ability to remain where they are placed into service by a user, including their not falling to the floor even in the absence of force being applied to them at the region where they do or will make contact with the seatback.

Additional Aspects of the Above Embodiments

The embodiments of FIGS. 11 through 19 include various structures to enable the devices to be right-fitted to an arm of the tray table and thereby discourage disadvantageous displacement of the embodiment from where it has been deployed by a user—whether such movement is caused by the application of a reclining force or otherwise other than by the user. The extent to which each device of the invention can achieve an advantageously stable engagement with the arm and the manner in which each device can be so stably engaged by a user with the arm can vary from device to device and from arm to arm.

The embodiments of FIGS. 5 through 19 include various structures to enable the devices to achieve a beneficial degree of stability where they have been placed by a user so that they can serve to limit the extent to which an immediately forward seat can be reclined by a passenger seated in such seat. Some such structures discourage an embodiment from being disadvantageously moved from where it has been placed by the user when a person attempts to recline a seat against which the embodiment has been deployed thereby resulting in reclining force being applied to the embodiment. Some such structures discourage an embodiment from becoming disadvantageously moved inadvertently from where they have been placed by the user, such as simply because of air turbulence. For example, the rod 190 is formed such that it extends across both arms of the tray table assembly, thereby enabling its stability. This may be compared to a rod that is formed such that it would not so extend, such that it would only be susceptible to placement on one arm of the tray table assembly from where it could easily be caused to fall to the floor by air turbulence.

Another example of a structure which enables a beneficial degree of stability is U-bracket 171 which enhances the engagement of U-brace 170 embodiment with table 153 of tray table assembly 150. This U-brace embodiment may be compared to such a device that is similar but which does not comprise such bracket or any replacement therefore, instead being formed with an intention that adjustable post 174 be directly engaged with front edge 156 of table 153. With such a direct post-to-front edge engagement, beneficial stability would be lacking in that a jostling of seatback-F 103$f$ could cause the post to slip from its engagement with the front edge, either above or below such table, for example.

Such various stability enabling structures may sometimes be referred to as stabilizing means. Right-sizing means is one type of stabilizing means.

Safety Control Embodiment

FIGS. 20 and 21 illustrate another preferred embodiment of the seat checking device of the invention, namely a device that helps a passenger protect himself from an inopportune reclining of a seat directly in front of him, such device being generally integrated with said seat and enabling the passenger to lock out the otherwise designed recline capability of such seat.

This embodiment employs a recline lock-out approach similar in some respects to the one disclosed in Lee. However, a distinguishing feature of the safety control embodiment of the instant invention comprises its inclusion of a recline inhibitor input component specially located so as to provide convenient access to a passenger seated directly aft of a seat that might otherwise be reclined.

FIG. 20 shows seat 100$x$, comprising seatback-F assembly 102$f$ and rearward portion 104. The seat here further comprises armrests 401, a main control 402 installed in and accessible at one of said armrests, and a depressible safety input control 412 installed in and accessible at rearward portion 104, such safety input control comprising a shaft 412$a$ and a head 412$b$.

Prior art discloses seats with an internal mechanism and an external interface allowing a passenger to recline his seat. A typical user interface takes the form of an actuator button—here, main control 402 integrated into one of the armrests 401. By pressing in the main control, the passenger can affect a connected mechanism within the seat so as to allow the seatback to be reclined fully to its predetermined limit, allow it to be brought to its upright position, and allow it to be positioned at an angle of recline anywhere in between, generally at the passenger's sole discretion. Once said passenger establishes a desired angle of recline for his seatback, said angle can generally be maintained by releasing such main control.

The preferred embodiment of the invention shown here provides another control means, namely a control means for a passenger seated directly behind seat 100$x$, with the passenger interface taking the form of depressible safety input control 412. It is this provision of control, in an integrated form, to this aft passenger that is the primary novel aspect of the embodiment shown here.

In FIG. 20 safety input control 412 is shown in an inactive mode—that is, it is extended from the back of rearward portion 104 and in that position does not cause interference with a reclining of its seatback-F assembly 102$f$.

In FIG. 21, a partial-section of FIG. 20, safety input control 412 is shown in an active mode—that is, the aft passenger has pushed depressible safety input control 412 inward so as to cause means operationally connected to the safety input control to regulate the ability of the seatback assembly to be reclined, regardless of whether main control 402 is depressed.

It should be noted that the just-referenced operationally connected means is not shown here and this embodiment of the instant invention could be built as an adaptation of Lee, making use of the system disclosed in Lee or another having a comparable affect. Such adaptation would comprise inclusion of a safety input control per designated seat rather than a control per group of seats adjacent to a window exit as disclosed by Lee. And, each such safety input control would be advantageously located so as to provide convenient access to each passenger seated directly aft rather than exclusively to a crew member.

The safety input control shown in FIGS. 20 and 21 is located in the seatback of the directly forward seat. This location facilitates a mechanical connection between the safety input control and the internal workings of the forward seat, though an alternate approach comprises an electronic or hydraulic connection, or the like. Such control might alternately be located within a component of the aft passenger's seat, such as in the armrest of such aft seat.

After being depressed, the illustrated safety input control 412 stays depressed in its active mode. The illustrated safety input control can be pulled out by the aft passenger, if desired, to allow the passenger seated in seat 100$x$ to recline.

Also, the safety input control and its associated operationally connected means can be enhanced by a novel device which would cause the safety input control to pop out on its own into its inactive mode, without direct human manipulation, at the instigation of a master switch controlled by airline personnel. Or, such pop-out can be formed to be instigated by a mechanism within each seat or by a remotely located mechanism which is interconnected to multiple such safety input controls, such mechanism having been formed to operate automatically when the plane has been depressurized by the crew upon landing. Such enhancements can help avoid a situation in which a safety input control is left in the depressed active-mode position, perhaps from an earlier flight, even though there is no passenger seated directly behind the rearward portion in which it has been installed. Such enhancements can also obviate a time-consuming need for airline personnel to check that each safety stop is in its inactive mode setting prior to bringing on passengers for the next flight.

As an alternative embodiment of the novel depressible safety input control, an adaptation comprising a variable safety input control device can be provided such that the aft passenger can modulate the degree of reclining allowed by a passenger seated in front of him by setting the variable control device to a mark on a predetermined scale of levels of reclining, as circumstances are considered safe and appropriate by the aft passenger.

It should be noted that while the discussion herein is focused on airline seats and airline passengers, elements of the invention are applicable to seating arrangements on trains and buses and in personal vehicles, as well as to other seating arrangements irrespective as to whether such seats are installed on a vehicle.

Although only preferred embodiments are specifically illustrated and described herein, it will be appreciated that many modifications and variations of the present invention are possible in light of the above teachings and within the purview of the appended claims, without departing from the spirit and intended scope of the invention. For example, embodiments of the present invention may be made from materials and processes not specifically disclosed herein. As another example, the design and benefits described herein for safety stop 10 and multi-step stop 10a, with specific reference to their channel 16 and the at least one step structure formed within such channel, are adaptable for application other than on seat assemblies, such as in other systems which would benefit from an effective stop that can so accommodate bars of varying thicknesses.

What is claimed is:

1. A device comprising:
a top and a bottom,
a main body, comprising a first front-or-back surface, a second front-or-back surface, a top surface, and a bottom surface,
a pair of appendages extending from said main body so as to be generally opposed to each other, said pair of appendages comprising a first appendage and a second appendage, wherein—
said first appendage comprises a first inner wall and said second appendage comprises a second inner wall effectively opposed to said first inner wall,
said first inner wall and said second inner wall in combination provide a general definition of a partially circumscribed space,
said inner walls are at a space width from each other,
between said pair of appendages said body comprises a top wall,
each of said pair of appendages comprises an appendage top proximate said top wall and an appendage bottom distal therefrom, and
at least a formed step structure of the second appendage, generally adjacent said second inner wall and between said pair of appendages, wherein said at least a step structure comprises a step tread effectively facing away from said top wall and a step wall effectively opposed to said first inner wall,
wherein said device comprises a plurality of receiving structures, said plurality of receiving structures comprising a first receiving structure comprising said first inner wall, said second inner wall, said step tread, and a first receiving reference width, and a second receiving structure comprising said first inner wall, said step wall, said top wall, and a second receiving reference width, said first receiving reference width being larger than said second receiving reference width, and
wherein said receiving structures are adapted, as to each other, for stable complementary receipt of objects of a plurality of objects comprising different widths.

2. The device of claim 1 wherein the device comprises—
a general rigidity, and
a full device width,
wherein each of said first wall, said second wall, and said step wall comprises an upper edge proximate said top wall and a lower edge distal therefrom, and wherein each of said receiving reference widths is determined with reference to—
a first vertical plane located proximate said lower edge of said first inner wall,
a second vertical plane located proximate said upper edge of said second inner wall for said first receiving structure and said step wall for said second receiving structure, and
a horizontal distance between said first and second vertical planes which is said each of said receiving reference widths,
wherein there is said plurality of objects, each object of which comprises a thickness within a range of thicknesses and a reference thickness within a range of reference thicknesses, and
wherein said receiving structures of said plurality of receiving structures are so dimensioned as to be hospitable to said stable complementary receipt of objects of the plurality of objects, said stable complementary receipt comprising—
said stable complementary receipt of a first object, from the plurality of objects, formed with a first reference thickness within a first range of reference thicknesses of the range of reference thicknesses, a first maximum reference thickness of the first range of reference thicknesses being generally not larger than said first receiving reference width and a first minimum reference thickness of the first range of reference thicknesses being generally not smaller than said second receiving reference width, and alternately
said stable complementary receipt of a second object, from the plurality of objects, formed with a second reference thickness within a second range of reference thicknesses of the range of reference thicknesses, a second maximum reference thickness of the second range of reference thicknesses being generally not larger than said second receiving reference width.

3. The device of claim 2 wherein—
said full device width comprises a pair of full width ends,
each of said appendages comprises an appendage width and an effective appendage width,
each said appendage width is a generally actual width of each of said appendages and each said effective appendage width is generally a distance from said inner wall of each of said appendages to an ipsilateral end of said pair of full width ends, and
said effective appendage widths are not equal.

4. The device of claim 3 wherein said at least a step structure of said second appendage comprises a plurality of formed step structures in a stairway configuration, said stairway configuration comprising an end and another end, wherein said end is adjacent said second inner wall and said another end is adjacent said top wall,
wherein said plurality of formed step structures is so dimensioned to create, in combination with said first and second inner walls, receiving structures of said plurality of receiving structures in a quantity that exceeds by one a quantity of said formed step structures of said plurality of step structures.

5. The device of claim 2 wherein said at least a step structure of said second appendage comprises a plurality of formed step structures in a stairway configuration, said stairway configuration comprising an end and another end, wherein said end is adjacent said second inner wall and said another end is adjacent said top wall,
wherein said plurality of formed step structures is so dimensioned to create, in combination with said first and second inner walls, receiving structures of said plurality of receiving structures in a quantity that generally exceeds by one a quantity of said step structures of said plurality of step structures.

6. The device of claim 2 wherein said general rigidity of said device comprises a first general rigidity of said body, a second general rigidity of each of said appendages, and a third general rigidity of a connection of each of said appendages to said,
wherein said general rigidities of said device and their combination comprise a rigidity resistance to failure of said device during a use of said device,
wherein said use comprises—
said stable complementary receipt of said first object by said first receiving structure or said second object by said second receiving structure, and
a subsequent application via a force-item of an operational force upon said device primarily within a contact region of the device, said contact region comprising an area generally proximate an effective intersection of a one of said front-or-back surfaces and said top surface and within said effective appendage width of said first appendage, wherein said subsequent application of the operational force is directed generally towards a diagonally distal area proximate an effective intersection of another of said front-or-back surfaces and said bottom of said first appendage and within said effective appendage width of said first appendage, which is generally towards the first or second object,
wherein said rigidity resistance to failure comprises a failure scenario selected from a group of failure scenarios consisting of—
said operational force causing said device to be substantially deformed such that said space width is substantially increased to an extent that there is a substantial reduction in areas of frictional contact between said device and the object, such that a continuing application of said operational force causes said device to be displaced along a length of the object,
said operational force causing said space width to be substantially increased to an extent at which a continuing application of said operational force causes said device to be displaced by effectively being at least partially twisted off of the object, wherein at least one area of the object with which said device is in contact serves as at least an initial pivot area,
said operational force causing said device to be substantially deformed such that it is substantially compressed,
such that in each of said failure scenarios of said group the force-item is not substantially inhibited from moving towards the first or second object.

7. The device of claim 6 wherein said at least a step structure of said second appendage comprises a plurality of formed step structures in a stairway configuration, said stairway configuration comprising an end and another end, wherein said end is adjacent said second inner wall and said another end is adjacent said top wall,
wherein said plurality of formed step structures is so dimensioned to create, in combination with said first and second inner walls, receiving structures of said plurality of receiving structures in a quantity that exceeds by one a quantity of said formed step structures of said plurality of step structures.

8. The device of claim 2 wherein said general rigidity of said device comprises a first general rigidity of said body, a second general rigidity of each of said appendages, and a third general rigidity of a connection of each of said appendages to said body,
wherein said general rigidities of said device and their combination comprise a rigidity resistance to failure of said device during a use of said device,
wherein said use comprises—
said stable complementary receipt of said first object by said first receiving structure or said second object by said second receiving structure, and
a subsequent application of an operational force upon said device from above at a contact area proximate a region of said device that is generally above and entirely ipsilateral to said first appendage, and then generally towards the first or second object,
wherein said rigidity resistance to failure comprises a failure scenario selected from a group of failure scenarios consisting of—
said operational force causing said space width to be substantially increased to an extent at which a continuing application of said operational force causes said device to be displaced by effectively being at least partially twisted off of the object, wherein at least one area of the object with which said device is in contact serves as at least an initial pivot area,
said operational force causing said device to be substantially deformed such that it is substantially compressed,
such that in each of said failure scenarios of said group the force-item is not substantially inhibited from moving towards the first or second object.

9. The device of claim 8 wherein said at least a step structure of said second appendage comprises a plurality of formed step structures in a stairway configuration, said stairway configuration comprising an end and another end, wherein said end is adjacent said second inner wall and said another end is adjacent said top wall,
wherein said plurality of formed step structures is so dimensioned to create, in combination with said first and second inner walls, receiving structures of said plurality of receiving structures in a quantity that exceeds by one a quantity of said formed step structures of said plurality of step structures.

10. The device of claim 2 in combination with a seat assembly comprising a seatback assembly which comprises a tray table assembly and a reclinable seatback,
wherein the reclinable seatback comprises an aft-facing element and a plurality of selectable recline conditions comprising a selectable fully reclined condition at a predetermined recline limit,
wherein the tray table assembly comprises a tray table, an arm, and a selectable deployed condition,
wherein, the deployed condition of the tray table assembly having been selected and the fully reclined condition of the seatback not having been selected, the arm comprises an arm segment substantially aft of the aft-facing element of the reclinable seatback,
wherein said stable complementary receipt of either said first or second object comprises a stable engagement of said device with the arm of the tray table assembly, the arm comprising an arm reference thickness within a corresponding either the first or the second range of references thicknesses,
wherein, the deployed condition of the tray table assembly having been selected and the fully reclined condition of the reclinable seatback not having been selected, said device is adapted to facilitate an arrangement of it into a restricting state, wherein said restricting state comprises, simultaneously, said stable engagement of said device with the arm segment and contact of said device with the aft-facing element of the reclinable seatback, wherein said device is braceably interposed between the arm segment and the aft-facing element, and wherein in said restricting state said device is adapted to inhibit reclining of the seatback.

11. The combination of claim 10 wherein said at least a step structure of said second appendage of said device comprises a plurality of formed step structures in a stairway configuration, said stairway configuration comprising an end and another end, wherein said end is adjacent said second inner wall and said another end is adjacent said top wall, wherein said plurality of formed step structures is so dimensioned to create, in combination with said first and second inner walls, receiving structures of said plurality of receiving structures in a quantity that generally exceeds by one a quantity of said step structures of said plurality of step structures.

12. A checking device in combination with at least one seat assembly, the at least one seat assembly comprising a plurality of seat assembly elements comprising a seatback assembly which comprises a tray table assembly and a reclinable seatback, wherein the tray table assembly comprises a plurality of selectably deployable structures comprising an arm and a table, and wherein the reclinable seatback comprises an aft-facing element and a selectable fully reclined condition, said checking device comprising— a generally rigid body, at least one generally rigid appendage extending from said body generally non-linearly as to said body, and a generally rigid connection of said at least one appendage to said body, wherein said checking device is adapted for at least a portion thereof to be stably braced effectively between the aft-facing element of the reclinable seatback, the selectable fully reclinable condition of the reclinable seatback not having been selected, and an aft-brace base comprising a seat assembly element of the plurality of seat assembly elements of the at least one seat assembly, the seat assembly element being substantially aft of the aft-facing element of the seatback, the device being forward-braced against the aft-facing element of the seatback and aftward-braced against the aft-brace base, and wherein said checking device is not generally integrated with said seat assembly.

13. The combination of claim 12 wherein said checking device is formed so as to comprise failure resistance, said failure resistance comprising at least one stability enhancing means, wherein said at least one stability enhancing means comprises a combination-T of said at least one appendage and said connection of it to said body, in that said at least one appendage is adapted for a direct under-force contact with one of either the aft-facing element of the seatback or the support-base, wherein said direct under-force contact comprises a force occasioned by an application of a reclining force to the reclinable seatback intended to cause the reclinable seatback to move towards an aftward predetermined recline limit, said device having been earlier stably braced effectively directly between the aft-facing element and the aft-brace base, and said combination-T has been formed so as to be resistant to substantial deformation when said device has been stably braced effectively directly between the aft-facing element and said support base and subsequently said reclining force is so applied, wherein said substantial deformation of said combination-T comprises a substantial reduction in an effectiveness of said checking device being stably braced effectively between the aft-facing element and the aft-brace base in that said deformation negatively affects a structurally significant component of a structural brace while under pressure and in frictional contact with at least one of the items of the two items between which the devices has been so stably braced, whereby said failure resistance of said checking device facilitates effective inhibition of the seatback being reclined to the aftward predetermined recline limit.

14. The combination of claim 12, the aft-brace base being further restricted in that it comprises a selectably deployable structure of the plurality of selectably deployable structures of the tray table assembly of the seat assembly which comprises the aft-facing element of the seatback against which the device is forward-braced.

15. The combination of claim 14 wherein the checking device further comprises a second appendage so as to comprise a pair of appendages, said second appendage generally rigidly connected to said body so as to be generally opposed to said at least one generally rigid appendage, wherein said at least one appendage comprises a first inner wall and said second appendage comprises a second inner wall opposed to said first inner wall, and said inner walls are at a space width from each other.

16. The combination of claim 15, said checking device further comprising means for adjusting a distance between the first appendage and the second appendage.

17. The combination of claim 16 wherein said means for adjusting a distance between said first appendage and said second appendage of said device comprises a means for adjusting selected from a group consisting of dynamic adjusting means and generally static adjusting means, wherein said dynamic adjusting means comprise means for moving at least one of the pair of appendages so as to change the width of said space width to a new space width and reversibly fix said new space width, wherein said generally static adjusting means comprises at least one static adjusting element selected from a group of static adjusting elements, said group consisting of— a plurality of receiving structures between said pair of appendages comprising a generally like plurality of receiving reference widths, each said receiving structure at least partially adjacent to another, at least one receiving structure between said pair of appendages being resiliently dilatable whereby said effective distance between said pair of appendages of said device may be effectively adjusted generally statically with finer granularity, wherein said means for adjusting is adapted to facilitate a stable complementary receipt of objects, wherein said stable complementary receipt of objects comprises alternate receipt of any of a plurality of objects which comprise a plurality of reference thicknesses.

18. The combination of claim 17, the aft-brace base being further restricted in that it comprises the arm of the tray table assembly.

19. The combination of claim 18, wherein said group of static adjusting means is further restricted to consist only of static adjusting means and wherein said checking device comprises at least a formed step structure of the second appendage, generally adjacent a second inner wall of said second appendage and between said pair of appendages, wherein said at least a step structure comprises a step wall effectively opposed to a first inner wall of said at least one generally rigid appendage.

20. The combination of claim 13, the aft-brace base being further restricted in that it comprises a selectably deployable structure of the plurality of selectably deployable structures of the tray table assembly of the seat assembly which comprises the aft-facing element of the seatback against which the device is forward-braced.

21. A method for inhibiting a reclinable seatback of a forward seat assembly from being reclined, the method comprising the following processes:

ascertaining that the seatback is not in a selectable fully reclined condition at an aftward predetermined recline limit, causing at least one structure of a tray table assembly, which tray table assembly comprises a tray table which is deployable generally directly aft of the seat assembly, to be stably deployed so that the at least one structure is substantially aft of an aft-facing element of the seatback, providing a checking device comprising a general rigidity, within a range of general rigidities, that is not integrated with the seat assembly, said checking device comprising a rigid body comprising said general rigidity and at least one appendage comprising said general rigidity, wherein said appendage— extends from said body, generally non-linearly as to said body, and is connected to said body with a connection comprising said general rigidity, and stably interposing at least a portion of said checking device effectively between the aft-facing element of the seatback and the at least one structure of the tray table assembly, wherein said at least a portion of said checking device comprises a second portion, wherein said stably interposing comprises blocker-positioning said second portion between the aft-facing element and said predetermined recline limit, wherein said stably interposing further comprises causing contact between said at least one appendage and at least either the seatback or the tray table assembly, and wherein said contact comprises at least potentially pressured contact in an event that a reclining force is applied subsequently to the seatback intended to cause the seatback to move towards the aftward predetermined recline limit, and wherein said general rigidities are adapted to enable said checking device to resist, after said being stably interposed— substantial deformation under pressure of at least one element of the checking device, and displacement, said displacement comprising displacement resulting from substantial deformation under pressure of at least one element of the checking device, whereby, in the event that the reclining force is applied to the seatback subsequently, the seatback will be inhibited from reclining in that said checking device will physically impede the seatback before the seatback can be reclined to the aftward predetermined recline limit.

22. The method of claim 21, wherein the forward seat assembly comprises a seatback assembly, wherein the seatback assembly comprises the tray table assembly, a selectable upright condition, and the seatback which comprises the aft-facing element, wherein the tray table assembly comprises a plurality of structures, wherein a number of structures of the plurality of structures comprise a leading area and a trailing area, wherein the plurality of structures comprises the at least one structure of the tray table assembly, the tray table, and an arm, wherein the tray table assembly further comprises a selectable stowed condition and as an alternate a selectable deployed condition, the arm comprising a pair of ends, one of the pair of ends dynamically connected to the tray table and another of the pair of ends dynamically connected to the seat assembly, and the tray table comprising a top table surface, a bottom table surface, and a front edge, wherein the seat assembly is adapted to enable the seatback to be moved, by a forward passenger applying the reclining force to the seatback, from the selectable upright condition into a plurality of selectable recline conditions within an aftward recline zone, the plurality of selectable recline conditions comprising the selectable fully reclined condition at the aftward predetermined recline limit, wherein the aft-facing element of the seatback is adapted to be located generally at a zone aft-limit of the aftward recline zone when the seatback has been moved to the selectable fully reclined condition, wherein the tray table assembly is adapted to be moved from the selectable stowed condition to the selectable deployed condition by an aft passenger seated in a directly-aft seat, the selectable deployed condition comprising at least one structure of the tray table assembly being located effectively aft of the aft-facing element of the seatback when the seatback is not in the selectable fully reclined condition, wherein the selectable deployed condition of the tray table assembly further comprises the at least one structure of the tray table assembly being in a fixed condition that is resistant to being moved aftward when a portion of the reclining force is indirectly applied to it generally at its leading area and towards its trailing area, wherein said checking device is adapted to be positionable into a generally stable engagement with the at least one structure of the tray table assembly, wherein said body and said at least one appendage, in combination, are adapted to facilitate an arrangement of said checking device in said generally stable engagement with the at least one structure of the tray table assembly, wherein said generally stable engagement of said checking device with the at least one structure of the tray table assembly comprises said at least one appendage being in generally stable contact with the at least one structure of the tray table assembly, wherein said generally stable engagement of said checking device with the at least one structure of the tray table assembly facilitates a creation of a generally stable positioning of a blocking component of the checking device aft of and proximate the aft-facing element of the seatback and within the recline zone, and wherein the method further comprises the process of positioning said checking device—
so as to establish said generally stable engagement of said checking device with the at least one structure of the tray table assembly, and
so as to create a generally stable positioning of said blocking component aft of and in contact with the aft-facing element of the seatback and within the recline zone,
whereby, in the event that the reclining force is applied to the seatback subsequently by the forward passenger, the seatback will be inhibited from reclining in that said blocking component of said checking device is stably interposed between the seatback and the zone aft-limit, as well as effectively structurally interposed between the seatback and the at least one structure of the tray table assembly.

23. The method of claim 22, wherein said positioning of said checking device further comprises extending an extendable component of said checking device into an extended state and securing said extendable component in said extended state.

24. The method of claim 22, wherein said checking device comprises a means for fixing said at least one appendage at a plurality of alternate positions on said body.

25. The method of claim 22, wherein said checking device further comprises a generally rigid second appendage, wherein said second appendage extends from said checking device and is connected thereto by a generally rigid connection.

26. The method of claim 25 wherein said second appendage extends from the body of said checking device in an orientation generally effectively parallel and opposed to said at least one appendage and wherein between said at least one appendage and said second appendage there is a partially-circumscribed space,
wherein the at least one structure of the tray table assembly with which said checking device is positioned into contact is restricted to comprise the arm of the tray table, and
wherein said positioning of said checking device comprises causing said at least one appendage and said second appendage, in combination with said body, to straddle the arm.

27. The combination of claim 26, said checking device further comprising means for adjusting a distance between the first appendage and the second appendage.

28. The method of claim 27 wherein said means for adjusting a distance between said first appendage and said second appendage of said checking device comprises a means for adjusting selected from a group consisting of dynamic adjusting means and generally static adjusting means,
wherein said dynamic adjusting means comprise means for moving at least one of the pair of appendages so as to change the width of said space width to a new space width and reversibly fix said new space width,
wherein said generally static adjusting means comprise at least one static adjusting element selected from a group of static adjusting elements, said group consisting of—
a plurality of receiving structures between said pair of appendages comprising a generally like plurality of receiving reference widths, each said receiving structure at least partially adjacent to another,
at least one receiving structure between said pair of appendages being resiliently dilatable whereby said effective distance between said pair of appendages of said device may be effectively adjusted generally statically with finer granularity,
wherein said means for adjusting is adapted to facilitate a stable complementary receipt of objects, wherein said stable complementary receipt of objects comprises alternate receipt of any of a plurality of objects which comprise a plurality of reference thicknesses.

29. The method of claim 28 wherein said checking device comprises connections that are permanently fixed between said body and each of said at least one appendage and said second appendage, such that a width of said partially-circumscribed space cannot be reduced by moving either said at least one appendage or said second appendage in relation to said body.

30. The method of claim 29 wherein said at least one appendage comprises a first inner wall and said second appendage comprises a second inner wall,
wherein proximate a top of said partially-circumscribed space said body comprises a top wall between said first inner wall and said second inner wall,
wherein said second appendage further comprises at least one formed step structure adjacent said second inner wall, wherein said at least one step structure comprises a step tread effectively parallel to and facing away from said top wall and a step wall effectively parallel and opposed to said first inner wall,
wherein said checking device comprises a first receiving structure comprising said first inner wall, said second inner wall, said step tread, and a first receiving reference width, and a second receiving structure comprising said first inner wall, said step wall, said top wall, and a second receiving reference width, wherein said first receiving reference width is larger than said second receiving reference width,
wherein said first receiving structure is adapted to receive the tray table arm when the arm is formed with a first reference thickness within a first range of reference thicknesses, a first maximum reference thickness of which is generally not larger than said first receiving width, and said second receiving structure is adapted to receive, alternately, the arm when the arm is formed with a second reference thickness within a second range of reference thicknesses, a second maximum reference thickness of which is generally not larger than said second receiving width, and
wherein the method further comprises adjustably positioning said checking device into said generally stable engagement with the arm of the tray table assembly such that the arm becomes engaged with a one of said receiving structures whose receiving reference width is generally closest to, but generally not smaller than, an associated reference thickness of the arm.

31. The method of claim 30 wherein said at least one formed step structure of said second appendage comprises a plurality of step structures formed in a stairway configuration, said stairway configuration comprising an end and another end, wherein said end is adjacent said second inner wall and said another end is adjacent said top wall, and
wherein said checking device is adapted to receive the tray table arm when the arm is formed with a reference thickness within a number of ranges of reference thicknesses, said number of ranges being equal to one more than the number of step structures of the device.

* * * * *